United States Patent [19]
Ohashi

[11] Patent Number: 5,390,291
[45] Date of Patent: Feb. 14, 1995

[54] METHOD FOR INTERPOLATING BETWEEN TWO REGIONS OF A DISPLAY

[75] Inventor: Yoshikazu Ohashi, Richardson, Tex.

[73] Assignee: Atlantic Richfield Company, Los Angeles, Calif.

[21] Appl. No.: 771,379

[22] Filed: Sep. 30, 1991

Related U.S. Application Data

[63] Continuation-in-part of Ser. No. 593,144, Oct. 5, 1990.

[51] Int. Cl.$^6$ .............................................. G06F 15/62
[52] U.S. Cl. ...................................... 395/119; 395/141
[58] Field of Search ............... 395/119, 124, 141, 152; 382/49, 6, 55; 364/413.13, 413.16, 413.18, 413.19

[56] References Cited

U.S. PATENT DOCUMENTS

| | | | |
|---|---|---|---|
| 4,641,351 | 2/1987 | Preston, Jr. | 382/6 |
| 4,809,348 | 2/1989 | Meyer et al. | 382/49 |
| 4,894,776 | 1/1990 | Dekel | 364/413.13 |

*Primary Examiner*—Mark K. Zimmerman
*Attorney, Agent, or Firm*—Joseph E. Rogers

[57] ABSTRACT

A method of forming three dimensional displays (100) from a series of two dimensional sections (102) by interpolation using image algebraic operations or distance measurements on the two dimensional sections to generate interpolation sections (104). The interpolating region between two regions in successive sections is generated automatically. Multiple interpolation regions connecting the original two regions may be included.

1 Claim, 15 Drawing Sheets

4-CONNECTED

8-CONNECTED

4-CONNECTION MODE

8-CONNECTION MODE

FIG. 11
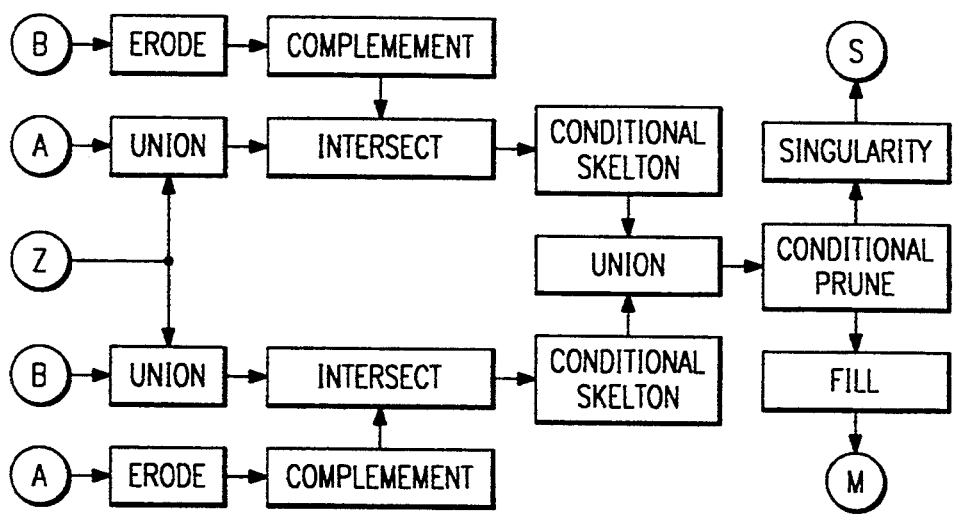
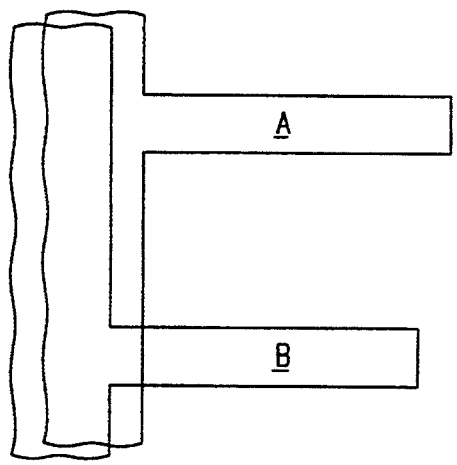
FIG. 12A
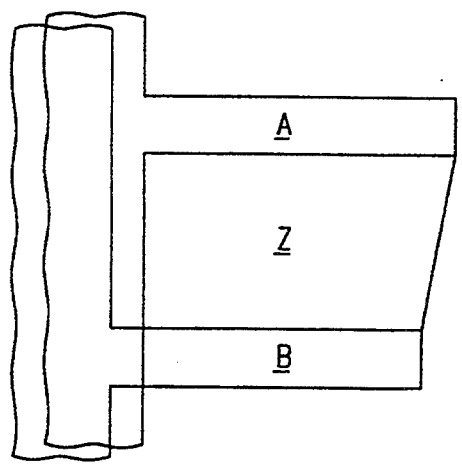
FIG. 12B
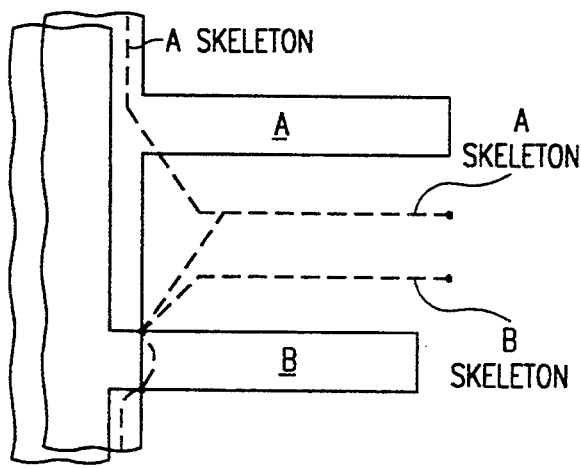
FIG. 12C

Z AND XOR(A,B)

SKELETONED

PRUNED

MIDDLE LAYER M

| | | | | | | | | | | | | | | | | | | | | |
|---|---|---|---|---|---|---|---|---|---|---|---|---|---|---|---|---|---|---|---|---|
| 5 | 5 | 4 | 3 | 4 | 5 | 6 | | | 0 | 1 | 2 | 3 | 4 | 5 | 6 |
| 5 | 4 | 3 | 2 | 3 | 4 | 5 | | | 1 | 0 | 1 | 2 | 3 | 4 | 5 |
| 4 | 3 | 2 | 1 | 2 | 3 | 4 | | | 2 | 1 | 0 | 1 | 2 | 3 | 4 |
| 3 | 2 | 1 | 0 | 1 | 2 | 3 | | | 3 | 2 | 1 | 0 | 1 | 2 | 3 |
| 4 | 3 | 2 | 1 | 2 | 3 | 4 | | | 4 | 3 | 2 | 1 | 0 | 1 | 2 |
| 5 | 4 | 3 | 2 | 3 | 4 | 5 | | | 5 | 4 | 3 | 2 | 1 | 0 | 1 |
| 6 | 5 | 4 | 3 | 4 | 5 | 6 | | | 6 | 5 | 4 | 3 | 2 | 1 | 0 |

DISTANCE FROM A POINT AND FROM A LINE
FOR THE 8-CONNECTED MODE. ONLY
FOUR IMMEDIATE CELLS ARE EXPANDED.

*FIG. 15A*

| | | | | | | | | | | | | | | | |
|---|---|---|---|---|---|---|---|---|---|---|---|---|---|---|---|
| 3 | 3 | 3 | 3 | 3 | 3 | 3 | | | 0 | 0 | 1 | 1 | 2 | 3 | 3 |
| 3 | 2 | 2 | 2 | 2 | 2 | 3 | | | 1 | 0 | 0 | 1 | 2 | 2 | 3 |
| 3 | 2 | 1 | 1 | 1 | 2 | 3 | | | 1 | 1 | 0 | 1 | 1 | 2 | 2 |
| 3 | 2 | 1 | 0 | 1 | 2 | 3 | | | 2 | 1 | 0 | 0 | 1 | 1 | 2 |
| 3 | 2 | 1 | 1 | 1 | 2 | 3 | | | 2 | 1 | 1 | 0 | 0 | 1 | 1 |
| 3 | 2 | 2 | 2 | 2 | 2 | 3 | | | 2 | 2 | 1 | 1 | 0 | 0 | 1 |
| 3 | 3 | 3 | 3 | 3 | 3 | 3 | | | 3 | 2 | 2 | 1 | 1 | 0 | 0 |

DISTANCE FROM A POINT AND FROM A LINE
FOR THE 4-CONNECTED MODE. EIGHT CELLS
INCLUDING DIAGONAL POSITIONS ARE EXPANDED.

*FIG. 15B*

| | | | | | | | | | | | | | | | | | | | |
|---|---|---|---|---|---|---|---|---|---|---|---|---|---|---|---|---|---|---|---|
| . | . | . | . | . | . | . | . | . | . | . | A. | A. | A. | A. | A. | A. | A. | A. | A. |
| . | . | . | . | . | . | . | . | . | . | A. | A. | 1. | 1. | 1. | 1. | 1. | 1. | 1. | 1. |
| . | . | . | . | . | . | . | . | . | A. | 1. | 1. | 2. | 2. | 2. | 2. | 2. | 2. | 2. | 2. |
| . | . | . | . | . | . | . | . | A. | 1. | 2. | 2. | 3. | 3. | 3. | 3. | 3. | 3. | 3. | 3. |
| . | . | . | . | . | . | . | . | A. | 1. | 2. | 3. | 4. | 4. | 4. | 4. | 4. | 4. | 4. | 4. |
| . | . | . | . | . | . | . | A. | 1. | 2. | 3. | 4. | 5. | 5. | 5. | 5. | 5. | 5. | 5. | 5. |
| . | . | . | . | . | . | A. | 1. | 2. | 3. | 4. | 5. | 6. | 6. | 6. | 6. | 6. | 6. | 6. | 6. |
| . | . | . | . | . | A. | 1. | 2. | 3. | 4. | 5. | 6. | 7. | 7. | 7. | 7. | 7. | 7. | 7. | 7. |
| . | . | . | . | A. | 1. | 2. | 3. | 4. | 5. | 6. | 7. | 8. | 8. | 8. | 8. | 8. | 8. | 8. | 8. |
| . | A. | 1. | 2. | 3. | 4. | 5. | 6. | 7. | 8. | 9. | 9. | 9. | 9. | 9. | 9. | 9. | 9. | 9. | |
| A. | 1. | 2. | 3. | 4. | 5. | 6. | 7. | 8. | 9. | 10. | 10. | 10. | 10. | 10. | 10. | 10. | | | |
| A. | 1. | 2. | 3. | 4. | 5. | 6. | 7. | 8. | 9. | 10. | 11. | 11. | 11. | 11. | B. | B. | B. | B. | |
| A. | 1. | 2. | 3. | 4. | 5. | 6. | 7. | 8. | 9. | 10. | 11. | 12. | 12. | B. | . | . | . | . | |
| . | A. | 1. | 2. | 3. | 4. | 5. | 6. | 7. | 8. | 9. | 10. | 11. | 12. | B. | . | . | . | . | |
| . | . | A. | 1. | 2. | 3. | 4. | 5. | 6. | 7. | 8. | 9. | 10. | B. | . | . | . | . | . | |
| . | . | . | A. | 1. | 2. | 3. | 4. | 5. | 6. | 7. | 8. | 9. | B. | . | . | . | . | . | |

A DISTANCE MAP FROM BOUNDARY A (8-CONNECTED MODE). CELLS LABELED A ARE
A BOUNDARY OF THE REGION A. A BOUNDARY B IS GIVEN BY CELLS LABELED B.

A DISTANCE MAP FROM BOUNDARY B (8-CONNECTED MODE).
NOTE THAT THE MAXIMUM STEPS REQUIRED TO REACH THE OTHER BOUNDARY IS NOT NECESSARILY THE SAME AS THAT FOR REVERSE DIRECTION

A RELATIVE DISTANCE MAP COMPUTED FROM TWO DISTANCE MAPS SHOWN ABOVE. NUMBERS SHOWN ARE IN PERCENTILE WITH A=0 AND B=100.

FIG. 16C

INTERSECTION BETWEEN
SETS A AND B

AN INTERLAYER IN
A SET DIFFERENCE A/B

AN INTERLAYER IN
A SET DIFFERENCE B/A

AN INTERLAYER AS
UNIONS OF THREE AREAS

SECTION A

SECTION B

SECTIONS A AND B
SUPERIMPOSED

DISTANCE MAP FROM
BOUNDARY A

DISTANCE MAP FROM
BOUNDARY B

RELATIVE DISTANCE MAP
FROM BOUNDARY A

BOUNDARIES OF
INTERLAYERS

PERSPECTIVE VIEW OF THE BRANCHED OBJECT CREATED

DATA FLOW IN A RELATIVE DISTANCE MAP CALCULATION

METHOD FOR INTERPOLATING BETWEEN TWO REGIONS OF A DISPLAY

CROSS REFERENCE TO RELATED APPLICATIONS

This application is a continuation-in-part of copending U.S. patent application Ser. No. 593,144, filed Oct. 5, 1990.

PARTIAL WAIVER OF COPYRIGHT PURSUANT TO 1077 O.G. 22 (Mar. 20, 1987)

All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright has no objection to the facsimile reproduction by anyone of the patent document or patent disclosure, as it appears in the United States Patent and Trademark Office patent file or records, but otherwise reserves all copyright whatsoever.

BACKGROUND AND SUMMARY OF THE INVENTION

The present invention relates to three-dimensional displays, and, more particularly, to generation of three-dimensional displays from two-dimensional cross sections.

Information about a three-dimensional object is frequently only available in the form of a series of parallel two-dimensional cross sections of the object, and three-dimensional displays must be reconstructed from such cross sections. For example, CAT scans of a human brain provide a series of cross sections which can be stacked to yield an accurate three-dimensional display of the brain if the spacing between successive cross sections is small enough. Likewise, seismic exploration frequently acquires data along parallel surface lines and thereby generates a series of two-dimensional sectional images of the earth's subsurface formations. Similarly, analyses of the microstructure of rocks often depends upon two-dimensional cross sections. Some bulk rock properties such as porosity and grain size can be determined directly from these sections, but truly three-dimensional properties such as connectivity of pores need three-dimensional analysis. In contrast to the case of a human brain, the anisotropies of microstructures in rocks are not typically known prior to cross sectioning, and so the optimal spacing of successive cross sections is unknown. Further, the cost of performing cross sectioning tends to lessen the number of sections taken and thereby increase the spacing between successive sections. Thus there is a problem of creating three-dimensional displays from a series of spaced parallel two-dimensional cross sections.

E. Keppel, Approximating Complex Surface by Triangularization of Contour Lines, 19 IBM J.Res.Dev. 2 (1975), formulated the problem of approximating the shape of a 3-D object from a series of sections as a combinatorial problem of graphs. His approach is stated as: Given polygonal contours on two sections, find a set of triangular patches that yield the optimal shape between two sections. A criterion for the optimal shape varies from the maximum volume (Keppel, 1975) to the minimum surface of Fuchs et al, Optimal Surface Reconstruction from Planar Contours, 20 Communications of the ACM 693 (1977), and locally minimized paths of Christiansen and Sederberg, Conversion of Complex Contour Line Definitions into Polygonal Element Mosaics, 12 Computer Graphics, ACM-SIGGRAPH 187 (1978). One of the earliest applications to geological problems was for a shape reconstruction of brachiopoda by Tipper, The Study of Geological Objects in Three Dimensions by the Computerized Reconstruction of Serial Sections, 84 Journal of Geology 476 (1976), and Tipper, A method and Fortran Program for the Computerized Reconstruction of Three-Dimensional Objects from Serial Sections, 3 Computers and Geosciences 579 (1977), although his algorithm was general for any triangular patch problem.

As pointed out by Ganapathy and Dennehy, A New General Triangularization Method for Planar Contours, 16 Computer Graphics, SIGGRAPH-ACM 69 (1982), the number of possible triangular patches increases as a function of factorials of the number of nodes in two polygons. Thus the strategy of the more recent work is, rather than approaching the problem from a general combinatorial aspect, to decompose contours using various criteria such as the parity of radial intersections (P. A. Dowd, in Earnshaw (Ed.), Fundamental Algorithms for Computer Graphics, Springer-Verlag, Berlin 1985), tolerance (Zyda et al, 11 Computers & Graphics 393, 1987), and span pairs (Sinclair et al, 13 Computers & Graphics 311, 1989).

In order for the triangular patch algorithm (e.g., Christiansen and Sederberg) to be practical, the number of vertices of a polygonal contour must not be too large, typically not more than a couple of hundred. As is obvious from the typical images shown in FIGS. 2a–b, the boundary has to be overly simplified for this method. But because a microscopic cross section of a rock specimen contains very detailed information on the boundary shape, the resolution of boundaries should be maintained for interpolation without further simplification of the shape. Thus the present invention is based on pixel (picture element) data of a digitized image, but not on the polygonal contour approximation.

The present invention provides interpolation on the pixel level. In some preferred embodiments the difference region between two regions from successive cross sections is skeletonized to form the boundary of an interpolation region of the two regions, and in other preferred embodiments multiple interpolation cross sections are constructed from relative distances within the difference region.

BRIEF DESCRIPTION OF THE DRAWINGS

Some of the drawings are schematic for clarity.

FIG. 11 is a flow chart;

FIGS. 12a–c show additional region effects;

FIGS. 15a–b and 16a–c show distance measurements;

DETAILED DESCRIPTION OF THE PREFERRED EMBODIMENTS

Figure 1:
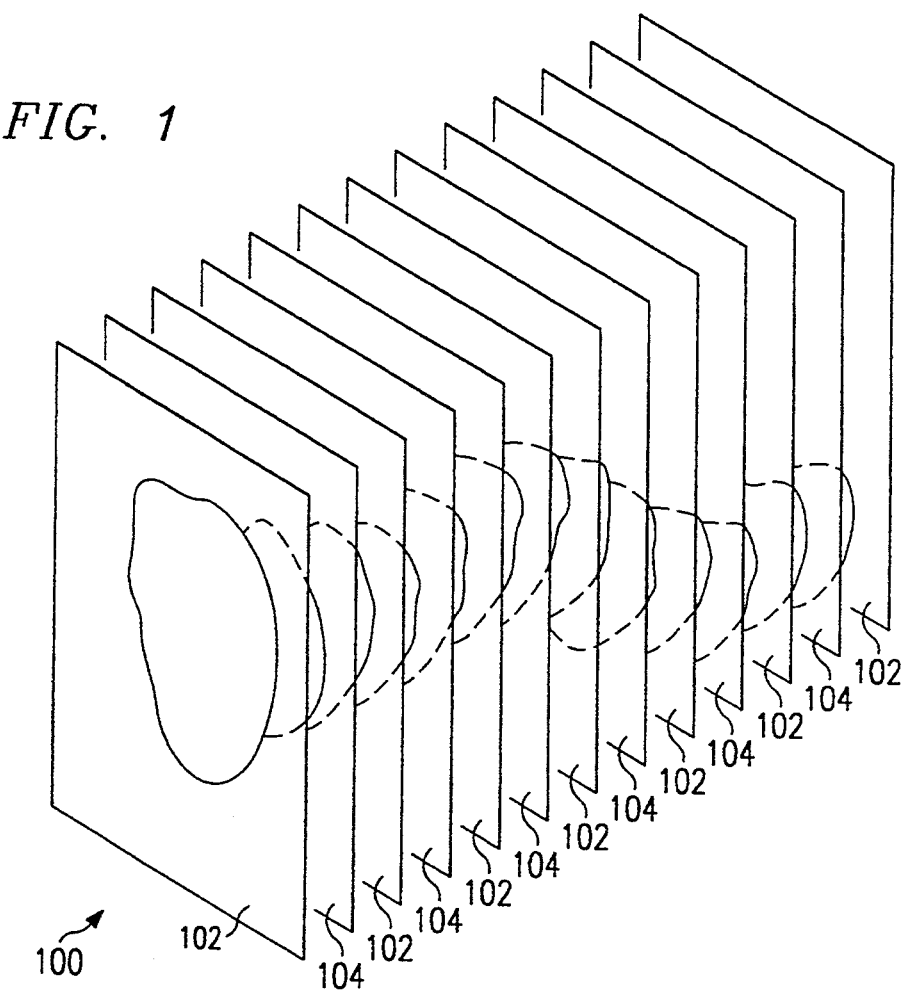
FIG. 1 is a schematic perspective view illustrating the first preferred embodiment method and display.

FIG. 1 schematically illustrates the first preferred embodiment three-dimensional display 100 including a series of parallel two-dimensional cross sections 102 plus a series of parallel interpolation sections 104 to fill in the middles between pairs of successive sections 102. The first preferred embodiment method creates the interpolation sections 104 by use of image algebra operations on pairs of sections 102 as described below.

Figure 2A:
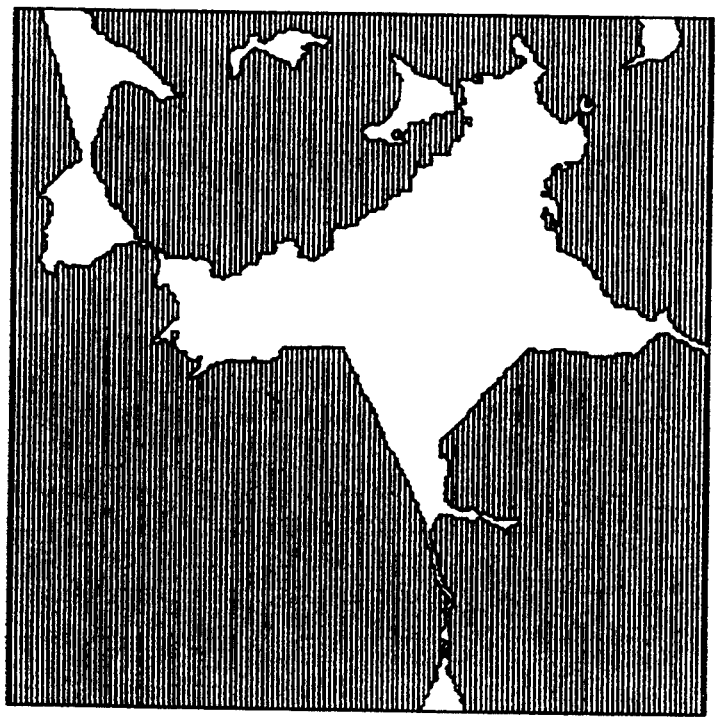
FIGS. 2a–b show successive cross sections.
Figure 2B:
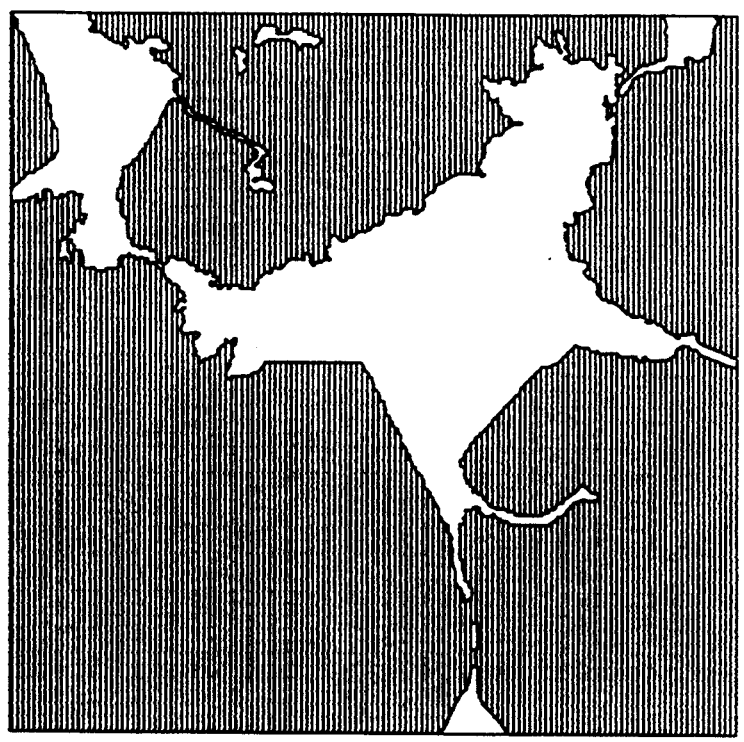

Sections 102 are binary-valued digitized images. FIGS. 2a–b show an exemplary pair of successive sections 102 which are cross sections of a rock with mineral grains represented by dark areas and pores among the grains as light areas. Each section is digitized as an array of 256 by 256 pixels. A three-dimensional display of such sections is useful in analyzing the pore connectivity of the rock.

Figure 3:
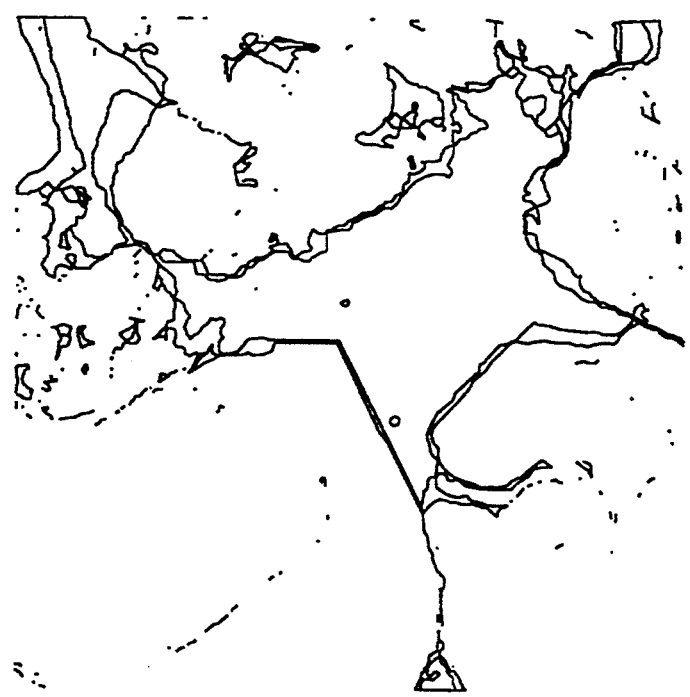
FIG. 3 illustrates overlapping regions.

After a description of the first preferred embodiment method, the method will be illustrated below (FIGS. 13a–f) by application to the two sections in FIGS. 2a–b to create an interpolating middle section between the two sections. But first a description of the method. FIG. 3 shows an overlay of the boundaries of the regions of FIGS. 2a–b and indicates the problem: to interpolate the boundaries to form a single boundary which then defines the regions of the middle section. Depending upon how rapidly a three-dimensional object being cross sectioned changes its shape, several cases can be identified.

Figure 4A:
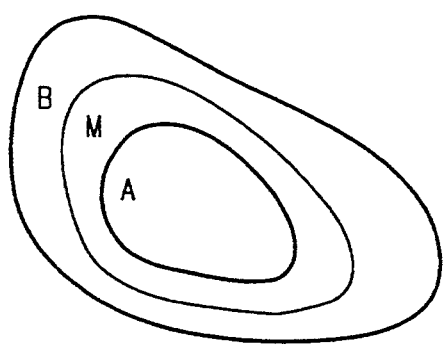
FIGS. 4a–b, 5, and 6 show overlap cases.

Case 1: the complete inclusion. If a region A of one section is totally contained in the corresponding region B of the adjacent section, the expected boundary of the middle region M in the interpolating section will be somewhere between the two boundaries of A and B; see FIG. 4a. Without additional information on the three-dimensional object being sectioned, it is natural to assume that the points of the boundary of the region M on the interpolating middle bisection are at equal distances from the boundaries of A and B.

Figure 4B:
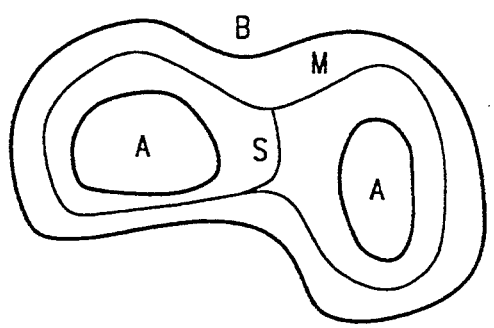

As a special case of this, a section can consist of multiple regions as shown in FIG. 4b. The object forms branches between the two sections. We assume that branching occurs at the bisection level. (This assumption does not exist in the fourth preferred embodiment method.) Then there is a special boundary of singularity (denoted S) that is degenerated into a single curve inside the region M. As in the previous case, points that are at the equal distance from region boundaries form the boundary of the interpolated region.

Case 2: a small offset with intersections. Next, consider a case in which two regions A and B intersect in the projection but the overall dissimilarity is relatively small; see FIG. 5. In more rigorous terms, the number of points in common between A and B is much larger than the number of points that are only in A or only in B. In this case we may still regard points at equal distance from the boundaries of A and B as the solution. By definition (with the zero distance), points (P1 and P2) at which boundaries of A and B intersect are also in the boundary of the middle region M.

Figure 6:
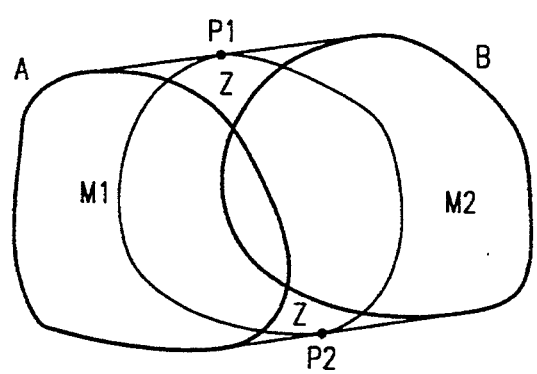

Case 3: No overlap or a large offset. Suppose the corresponding regions A and B are further displaced to the extent that fewer points are in common between A and B than those only in A or only in B; see FIG. 6. In the extreme case the regions A and B can be totally dissociated (i.e. no overlap in the projection). In this case we may still use the same approach with an additional region Z that is an area swept by an imaginary action of bringing the region A to the region B. The generation of the zone Z can be done in several ways: 1) common tangent lines between the two regions; 2) manual filling of the gaps or pits, and 3) the image algebraic CLOSE operations with a relatively large structuring element.

Considering all above cases, we can generalize that the boundary of the middle section M is included in the skeleton of the region that is in A but out of B (or vice versa) plus Z, provided that some special points such as P1 and P2 are specified, if necessary, as seeds for the skeleton. The region Z can be empty (cases 1 and 2) or a list of special points can be empty (case 1).

Figure 7A:
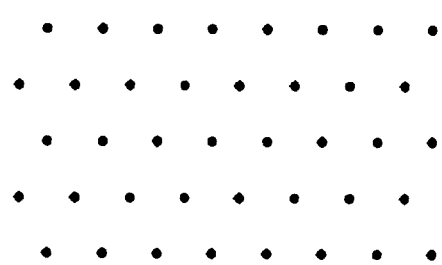
FIGS. 7a–b are grids for digitization.
Figure 7B:
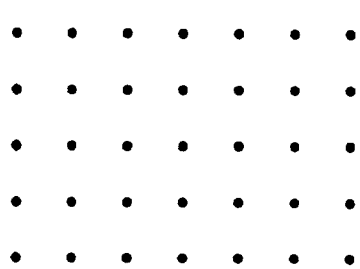
Figure 8A:
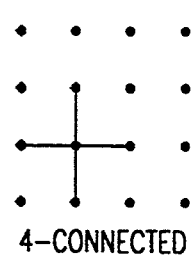
FIGS. 8a–d illustrate grid connectedness.
Figure 8B:
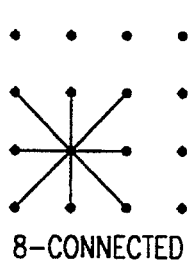
Figure 8C:
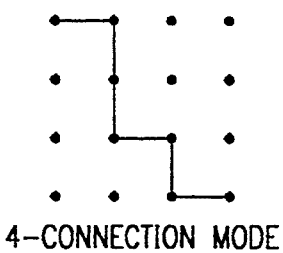
Figure 8D:
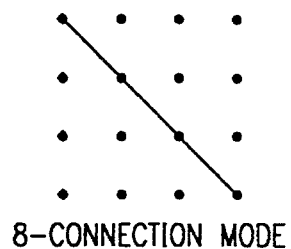

Types of digitization grids. Two frequently used patterns to digitize an image are a hexagonal grid and a square grid; see FIGS. 7a–b. Although the hexagonal grid has an apparent advantage of all direct neighbor points being at equal distances, its implementation on a general purpose graphics terminal is more involved than for the case of the square grid. Many dedicated image analysis systems adopt the hexagonal grid. Each point in a grid relates to an image pixel and is also called a cell.

Binary Images. The original gray-scale images of microphotographs or other two-dimensional data are transformed to a binary array using a threshold value appropriate to separate opaque regions (mineral grains) and transparent regions (pores). Pixels falling in pores are assigned the value one and those for mineral grains the value 0 because the pore geometry is of main interest (a reverse assignment will yield a negative of the same image). For this preferred embodiment an array of 256 rows and 256 columns was created this way for each section. All image algebraic operations described below are performed with a positive logic with the value of 1 representing true and 0 false.

Connection modes of cells in the square grid. In the square grid, the surrounding cells are not all at the equal distance from a cell of interest. Depending on which neighbors are considered as connected to the center cell one can distinguish two cases; see FIGS. 8a–d. The connectivity of cells in the square grid can be defined in two ways: 1) a four-connected mode in which only the immediate neighbors with the shortest distance are considered as connected or 2) an eight-connected mode where both first and second neighbors make connections. A selection of the connection mode is totally arbitrary, but once decided, it should be used consistently for all subsequent operations. A different set of structuring elements is required for image-algebraic operations such as erosion, dilation, and thinning. In this preferred embodiment the eight-connected mode is used throughout. The descriptions of operations and also their software implementations, however, include both modes.

Definitions of symbols for image algebra. Upper case letters designate sets and lower case letters elements of a set. For letters, a set X is a collection of points x of which values are true or 1, i.e. $X=\{x: x=1\}$. If a set X does not include any element, it is an empty set, $X=\phi$. A complement of X, expressed as $X^c$, is a set of points $x'$ that do not belong to set X, i.e. $X^c=\{x': x' \text{ not in } X\}$. Two fundamental set theoretical operations between two sets X and Y are the union ($\cup$) and the intersections ($\cap$).

$X \cup Y$: a set of points belonging to X or Y
$X \cap Y$: a set of points belonging to X and Y
Obviously by definition,
$X \cup X^c =$ the entire image
$X \cap X^c = \phi$ (the empty set)
Also the set difference is defined as,
$X/Y$: a set of points belonging to X but not Y, i.e. $X \cap Y^c$.

Hit or miss transformation. This is a key concept for many image algebraic operations used in the preferred embodiment. An intuitive definition of a hit-or-miss transform is given as follows; Superimpose a template (a structuring element) on a given image and do cell-by-cell comparison between the structuring element and the image. If all comparisons conclude true, this is a hit. If any of comparison turns out false, that is a miss. Record the hit position, normally by the location of the center cell of the structuring element with respect to the image grid. Translate the template and repeat the same procedure. For example, a structuring element

```
1 1 1
* 1 *
0 0 0
``` can be used to detect a bottom boundary cell. A hit with this structuring element means that the center cell, which is in the object (value 1), is at such a position that the top three cells belong to the object (1) and the bottom three cells to the background (0). Cells with a symbol * on the left and right of the center can be either in the object or the background. The original definition of the hit-or-miss transform is: A point x belongs to the hit-or-miss transform, HIT-OR-MISS (X,B), if and only if $B^1_x$ is included in X and $B^2_x$ is included in $X^c$, the complement of X, i.e., $$\text{HIT-OR-MISS}(X,B) = X \otimes B = \{x: B^1_x \subseteq X, B^2_x \subseteq X^c\}$$

where $B^1$ and $B^2$ are disjoint subsets of B and $B_x$ means B positioned at x. For the above example of B:

```
1 1 1
* 1 *
0 0 0
``` and disjoint sets are $$B^1 = \begin{matrix} 1 & 1 & 1 \\ * & 1 & * \\ * & * & * \end{matrix}$$

and $$B^2 = \begin{matrix} * & * & * \\ * & * & * \\ 1 & 1 & 1 \end{matrix}$$

Note that 0 elements in B are complemented to 1 in $B^2$ because $B^2_x$ within $X^c$ is for a complement of X where original zeros are changed to ones.

Erosion and dilation. Erosion and dilation, two fundamental operations of image algebra, are usually derived from the Minkowski addition and subtraction (see Serra, Image Analysis and Mathematical Morphology, Academic Press 1982, page 44; or Giardina & Dougherty, Morphological Methods in Image and Signal Processing, Prentice Hall 1988, page 6). A hit-or-miss transform can also be used to elegantly define these operations as its special case. If the structuring element does not contain elements 0 or a subset $B^2$ is empty, a hit-or-miss transform will give the erosion. For example the structuring elements in Table 1 are for the unit erosion by a unit translation, i.e. the region is eroded by one pixel deep from the boundary. We use a symbol $X^e$ for the unit erosion and $X^d$ for its complement, the unit dilation.

$X^e = \text{HIT-OR-MISS}$ (X,B in Table 1) $= X \otimes$ (B in Table 1)

TABLE 1

| Structuring elements for unit erosion/dilation in square grids | |
|---|---|
| 4-connected | 8-connected |
| 1 1 1 | * 1 * |
| 1 1 1 | 1 1 1 |
| 1 1 1 | * 1 * |

The erosion contracts the set and the dilation expands the set. The dilation operation can be defined as the erosion of the complement of the set by the duality theorem (Serra, page 588).

$$(X^d)^c = (X^c)^e$$

or taking the complement of both sides, we have, $$X^d = ((X^c)^e)^c$$

Boundary. A boundary of a region does not have any thickness in a continuous image but has a finite thickness of one pixel in the digital image. One could define the boundary as a transition between neighboring grid points. We prefer, however, the boundary to be represented by a connected set of pixels so that image algebraic operations are also valid for the boundary. There are two ways to define the boundary: one by the outermost pixels of the region, the other by pixels in the background that enclose the region. The boundary of a set X is then defined as a difference between the original and the eroded sets.

$\partial X = X/X^e$ Inner boundary $\partial X = X^c/(X^c)^e$ Outer boundary

Thinning. Thinning is the operation to reduce the size of the region, or to change cell contents selectively 1 to 0. As for erosion, a hit-or-miss operation is used to find appropriate cells for thinning. The center cell is changed from 1 to 0, if it is a hit, for the thinning operation. For example, using a structuring element B equal to

```
1 1 1
* 1 *
0 0 0
``` for a hit-or-miss transform, a bottom boundary cell can be detected and it is changed to 0, that is, one cell at the bottom boundary is removed or the object is thinned.

Skeletonization. In essence the skeleton operation is sequential thinning operations to peel a "skin", or the outer-most elements, of the object layer by layer until only one cell wide of the object is left. What is left after thee repeated pealing operations is a backbone of the object. With the above-mentioned structuring element B equal to

```
1 1 1
* 1 *
0 0 0
``` pixels at the bottom boundary can be removed.

Another hit-or-miss transformation with B equal to

```
1 * 0
1 1 0
1 * 0
``` which is derived by rotating the first one by 90 degrees counter-clockwise, follows in order to remove boundary cells from right. Thinning from the top and left directions will be done in the same way using the structure element that is rotated 90 degrees each time. In addition to these vertical and horizontal removals, diagonal elements, e.g. with B equal to

```
* 1 *
0 1 1
0 0 *
``` and its rotations, are also used alternately to complete thinning from eight directions 45 degree apart. In total eight structuring elements are used repeatedly until no new hit is found.

SKELETON(X)=REPEAT ( ... (X∘$L_1$)∘$L_2$) ...
)∘$L_8$ UNTIL NO HIT where a symbol ∘ denotes a thinning operation and $L_j$ (j=1–8) are structuring elements corresponding to eight directions 45 degrees apart. As given in Table 2, diagonal structuring elements are different for the eight-connected and the four-connected mode.

Pruning. A pruning operation is a type of sequential thinning especially for removals of terminal cells of chains. The pruning operation can eliminate non-boundary superfluous branches of chains. Similar to the skeleton operation, the pruning operation is defined as

PRUNE(X)=REPEAT ( ... (X∘$L_1$)∘$L_2$) ...
)∘$L_N$ UNTIL NO HIT where $L_j$ is one of the structuring elements listed in Table 2 or a rotation of one of the elements; N=4 for the 4-connected and N=16 for the 8-connected mode.

TABLE 2

| | Structuring elements for skeleton and prune operations in square grids | | | | |
| | 4-connected | | 8-connected | | |
|---|---|---|---|---|---|
| Skeleton | 1 1 1 | 1 1 * | | 1 1 1 | * 1 * |
| | * 1 * | 1 1 0 | | * 1 * | 1 1 0 |
| | 0 0 0 | * 0 * | | 0 0 0 | * 0 0 |
| Prune | * * * | | 0 * 0 | * 0 0 | * 0 * | 1 * 0 |
| | 0 1 0 | | 0 1 0 | 0 1 0 | 0 1 0 | * 1 0 |

TABLE 2-continued

| Structuring elements for skeleton and prune operations in square grids | | | | |
| 4-connected | | 8-connected | | |
|---|---|---|---|---|
| 0 0 0 | 0 0 0 | 0 0 0 | 0 0 0 | 0 0 0 |

Conditional skeletonization and pruning. The skeleton and prune operations, or in general any thinning or thickening operations, are relatively limited in their usefulness to real-world problems when applied unconditionally. In more realistic situations, the image is to be simplified by thinning operations while some of the original structure should be maintained. In other words, some pixels in the image are to be protected from being thinned. This type of image-algebraic operation is called a conditional operation (Serra, page 393), and operationally those protected pixels are reactivated after every thinning cycle.

CONDITIONAL-SKELETON (X)=SKELETON
(X:Y)=REPEAT ( ... (X∘$L_1$)∪Y)∘$L_2$)∪Y ...
)∘$L_8$∪Y) UNTIL NO HIT

CONDITIONAL-PRUNE (X)=PRUNE
(X:Y)=REPEAT ( ... (X∘$L_1$)∪Y)∘$L_2$)∪Y ...
)∘$L_N$∪Y) UNTIL NO HIT where Y is a set of conditional or protected points and N=4 for the 4-connected and N=16 for the 8=connected mode (See Table 2). For image-algebraic operations that increase a region's size such as dilation and thickening, these special pixels are prohibited from being turned on. Thus conditional operations for these operations include the intersection (∩) operation instead of the union (∪).

As shown later, the conditional thinning operations are used for image interpolation for the bisecting layer.

Curving intersection in the eight-connected mode. When a curve is regarded as continuous, the intersection of two curves is by definition points that belongs to both curves. Mathematically, Intersection of curve-A and curve-B=(curve A)∩(curve B)

Figure 9A:
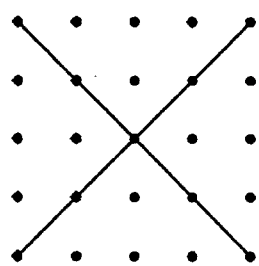
FIGS. 9a–b show line crossings.
Figure 9B:
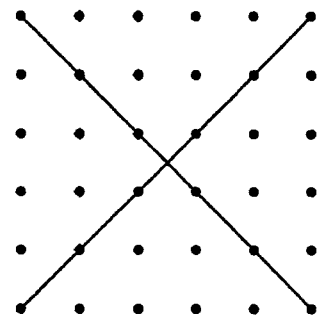

When a curve is represented by a set of discrete points, however, the above set theoretical operation may not be extended to find intersection points (See FIGS. 9a–b). Let us define a chain as a set of connected points.

Intersection of chain-A and chain-B=(chain A)∩(chain B) for 4-connected mode.

Intersection of chain-$A$ and chain-$B$ =

(chain $A$)∩(chain $B$)∪[(chain-$A$⊗$T^1$)∩(chain-$B$⊗$T^2$)]∪

[(chain-$A$⊗$T^2$)∩(chain-$B$⊗$T^1$)]

for 8-connected mode where $$T^1 = \begin{matrix} 1 & * \\ * & 1 \end{matrix} \quad \text{and} \quad T^2 = \begin{matrix} * & 1 \\ 1 & * \end{matrix}$$

The second and third terms are hit-or-miss transforms which return logical true when chains A and B crossover at non-grid points such as ab　　ba
ba　and　ab.

TABLE 3
Summary of image algebraic operations

| | | |
|---|---|---|
| X ∪ Y | union | a set of points in X or in Y |
| X ∩ Y | intersection | a set of points in X and in Y |
| X/Y | difference | a set of points in X but not in Y |
| $X^c$ | complement | a set of points not in X |
| $X^e$ | (unit) erosion | a set eroded by a unit translation |
| $X^d$ | (unit) dilation | a set dilated by a unit translation |
| ∂X | boundary | a set of outer-most points of X $\partial X = X/X^e$ |
| $B_x$ | translation | a set B translated by x |
| X⊗B | hit-or-miss transform | a set of points x at which an exact match of $B_x$ is found in X |
| X◯B | thinning | a set of points in X but not in X⊗B  X◯B = X/(X⊗B) |

Now we are going to design a series of image algebraic operations to generate a middle section configuration M from two regions A and B. The method can be split into two: one for the region inside A but outside B, that is $$A \cap B^c,$$

and the other for the region outside A but inside B, $A^c \cap B$. Note that $B^c$ is a set not in B, i.e., outside B. Because the second can be obtained by exchanging A and B only the first case will be discussed. If the boundaries of A and B coincide in a certain area, however, the above operation will leave no elements along the coincident boundary. To ensure such a boundary to be included, we erode one layer before the complement operation, $$A \cap (B^e)^c.$$

Figure 10:
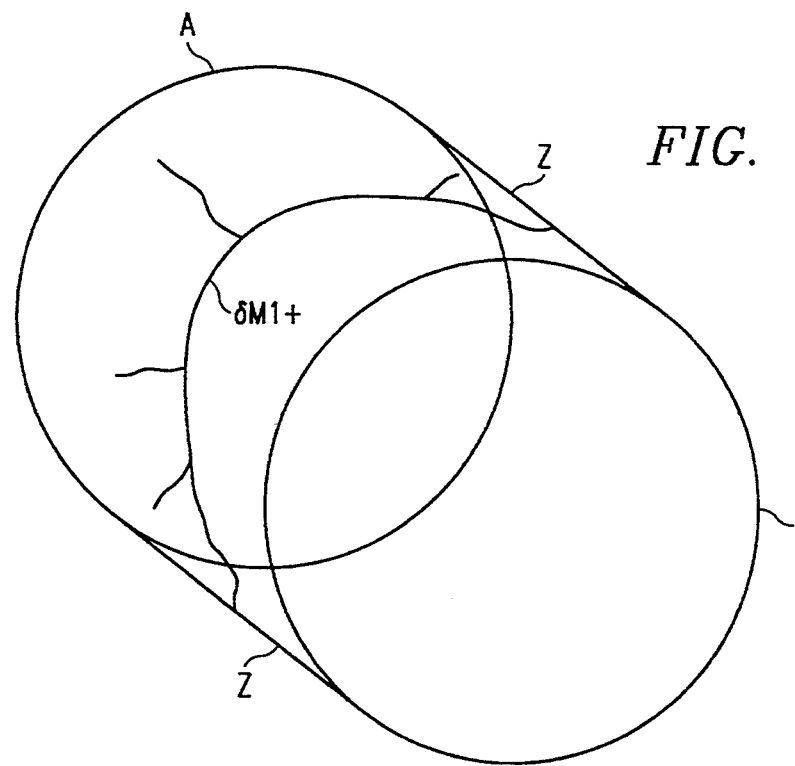
FIG. 10 shows a skeletonization.

If an additional region Z needs to be added, as in FIG. 10 for disk-shaped regions A and B, use $$(A \cup Z) \cap (B^e)^c$$

When the conditional skeleton operation is performed, the result (denoted as ∂M1+) contains a half of the boundary (denoted as ∂M1) of the desired region M. Note the the result of the above operation may still include extra points which are not a part of the boundary, thus in general $\partial M1 \subseteq \partial M1+$.

$$\partial M1+ = \text{SKELETON}\ ((A \cup Z) \cap (B^e)^c; C)$$

where C is a set for conditional points. The other half of the boundary, ∂M2, can be found by exchanging A and B.

$$\partial M2+ = \text{SKELETON}\ ((B \cup Z) \cap (A^e)^c; C)$$

Add these two skeletonal structures and remove branches with the conditional prune operation:

$$\partial M+ = \text{PRUNE}\ (\partial M1+ \cup \partial M2+; C'')$$

where C'' is a set for conditional points for pruning. Finally the region M will be $$M = \text{FILL}\ (\partial M+)$$

The FILL operation is to fill inside the boundary from seed cells. This is done by turning on cells, if they are not on the boundary, around seed cells recursively until there are no more cells to be transformed. The contour-filling-by-connection algorithm is given by Pavlidis, Algorithms for Graphics and Image Processing, Computer Science Press, Rockville, Md. 1982, page 180.

The difference set S+ between ∂M+ and a true boundary ∂M will include a set of singularity points if branching occurs.

$$S+ = \partial M+/\partial M = \partial M+ \cap (\partial M)^c$$

The above procedure is schematically summarized in FIG. 11.

The effect of an additional region Z can be easily illustrated. Consider FIG. 12a showing a portion of regions A and B each with a large projection; this situation occurs if the projections are sections of a gap that runs at an angle to the axis of the cross sectioning. As shown in FIG. 12b the additional region Z fills in the movement of the projection from one section to the successive section. Then as shown in FIG. 12c the conditional skeletons (shown as broken lines and with the endpoints on the Z boundary as conditional points) will reproduce the projection in the interpolated section provided that they are connected at the Z boundary and not pruned away. Note that the conditional point at the intersection of the A and B boundaries distorts the conditional skeletons, but without this conditional point the lefthand end portion of the B skeleton would have been lost simply because the skeleton of a square parallel to the grid is its single center point. Indeed, a figure with a sharp corner will have a skeleton including the corner point, but a figure with wide angle corners will lose the corners because the diagonal plus horizontal and vertical boundary operators operate at every 45 degrees.

FIGS. 12a-c also illustrate why the A skeleton and the B skeleton are separately performed rather than just one skeleton of the union of the difference sets: if a Z region is needed, then the two skeletal portions forming the two sides of the interpolated projection would be replaced by single central skeletal portion and have no interior to fill to become the interpolated projection.

One approach to definition of the Z region(s) connecting the A and B regions is as follows: form the smallest convex set containing A ∪ B, and subtract A ∪ B to form a first approximation for Z. Then discard all components of this first approximate Z that do not touch both A and B, this eliminates the portions that just filled up cavities in A or B alone. Lastly, discard all components that are large in two dimensions because the connection by Z is a filling of a local offset from A to B and should not be large in the direction of offset. This eliminates the large scale concavity filling. An alternative to this would be a series of overlapping initial local convex set formations and subtractions to form first approximations of local Zs, and then discard all components not touching both A and B. Lastly, all of the remaining local Zs are combined to form Z.

Another variation involving Z is a bisection of Z into $Z_A$ and $Z_B$ with $Z_A$ the portion closest to A and $Z_B$ the portion closest to B. Then for the skeletonization, use $(A \cup Z_A) \cap (B^e)^c$ and $(B \cup Z_B) \cap (A^e)^c$.

Conditional points for skeletonization include intersections of the boundaries of regions A and B and points on the boundary of Z and also the section edges are needed as conditional points for pruning.

Computer Implementation. This section describes software code development of the above mentioned functions for an Apple Macintosh computer. Algorithms were coded in Fortran 77 and complied with Language Systems Fortran 77 for MPW (Macintosh Programmer's Workshop). A listing of the program appears in the Appendix.

Data representation—Augmented image array. One of the sources of the algorithm complexity is how to treat rows and columns at the four edges of the image array which have valid entries only on one side. When a 3×3 structuring element is superimposed on an m x n image, for example, operations can be defined only for cells of which index ranges 2 to m−1 (or n−1). Repeated operations will end up with smaller and smaller images. Instead, we define an augmented array which has one extra row or column on each side of the array.

An array index can be assigned from 0 to m+1 and 0 to n+1. The image still occupies the center portion of the array but a hit-or-miss transform can be now defined at cell (1,1) by using cells on the margin. When a 3×3 structuring element is overlaid on the image array, the advantage of using the augmented array is 1) no special treatment is necessary for the first and the last rows (or columns) of the image, 2) an input array and an output array have the same dimension, and 3) thinning from the array boundaries can be prevented by setting margin cells all true. The margin cells, e.g. the 0-th row, can be set all true, or all false, or identical to the first row to the m-th row.

Below is a short list of functions written in Fortran. When two or more arguments are listed, the output array may be the same as the input. For example, NOT_IMAGE (A,A) will replace A with its complement.

Primary image algebraic operations. This group of functions includes:

| | |
|---|---|
| CLEAR_IMAGE (A) ... | Reset all entries of image array A to 0. |
| COPY_IMAGE (A,C) ... | Copy image array A to another array C. |
| NOT_IMAGE (A,C) ... | Create complement image C of A or change entries 0 to 1 and 1 to 0. |
| OR_IMAGES (A,B,C) ... | Create union image C of images A and B or pixel-wise OR operation. |
| AND_IMAGES (A,B,C) ... | Create intersection image C of images A and B or pixel-wise AND operation. |
| DEDUCT_IMAGES (A,B,C) ... | Create subtraction image C with images A less B or pixels in A but not in B. |
| XOR_IMAGES (A,B,C) ... | Create difference image C between images A and B or pixel-wise XOR operation. |

Erosion and dilation.

| | |
|---|---|
| ERODE_IMAGE (A,C) ... | Create unit erosion image C of image A. |
| DILATE_IMAGE (A,C) ... | Create unit dilation image C of image A. |

Skeleton and Prune. Template patterns listed in Table 2 are stored as template data and the SET_TEMPLATE function creates a target structuring element for the specified pattern and orientation.

| | |
|---|---|
| SET_TEMPLATE (pattern, orientation) ... | Internally called function to set a structuring element for a given pattern for a given orientation. |
| THIN_IMAGE (A,C) ... | Create thinned image C of image A using structuring element set by SET_TEMPLATE function. |
| SKELETON_IMAGE (A,C) ... | Create skeletonized image C of image A. |
| PRUNE_IMAGE (A,C) ... | Create pruned image C of image A. |

Margin functions. In order to initialize margin cells of the augmented array, four functions were implemented. Before any thinning operations, the TURN_MARGIN_ON function is called to prevent cells from being thinned at the image edges.

| | |
|---|---|
| TURN_MARGIN_ON (A) ... | Set all margin elements of array A to 1. |
| TURN_MARGIN_OFF (A) ... | Reset all margin elements of array A to 0. |
| CYCLE_MARGIN (A) ... | Copy bottom row to top margin, left column to right margin, etc. or arrange margins as repeat of adjacent row/columns. |

Boundary functions.

| | |
|---|---|
| IN_BOUNDARY (A,C) ... | Create inner-boundary set C or array A, or $C=\partial A$. |
| OUT_BOUNDARY ... | Create outer-boundary set C of array A, or $C=\partial A^c$. |
| CROSS_BOUNDARY (A,B,C) ... | Create a set C of intersecting points of boundaries A and B (non-grid intersections are treated correctly for a 8-connected mode). |

TEST RESULTS

Figure 13A:
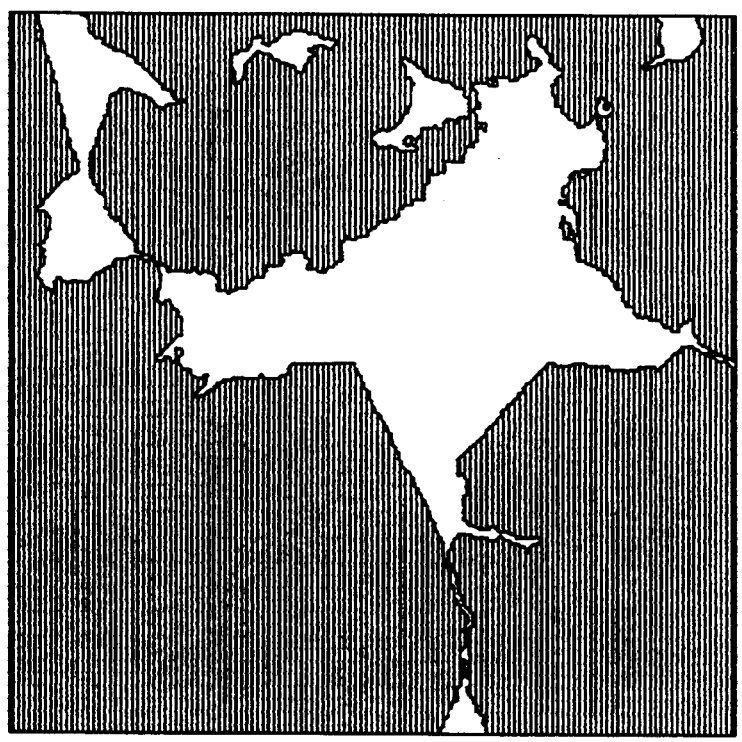
FIGS. 13a–f illustrate the first preferred embodiment.
Figure 13B:
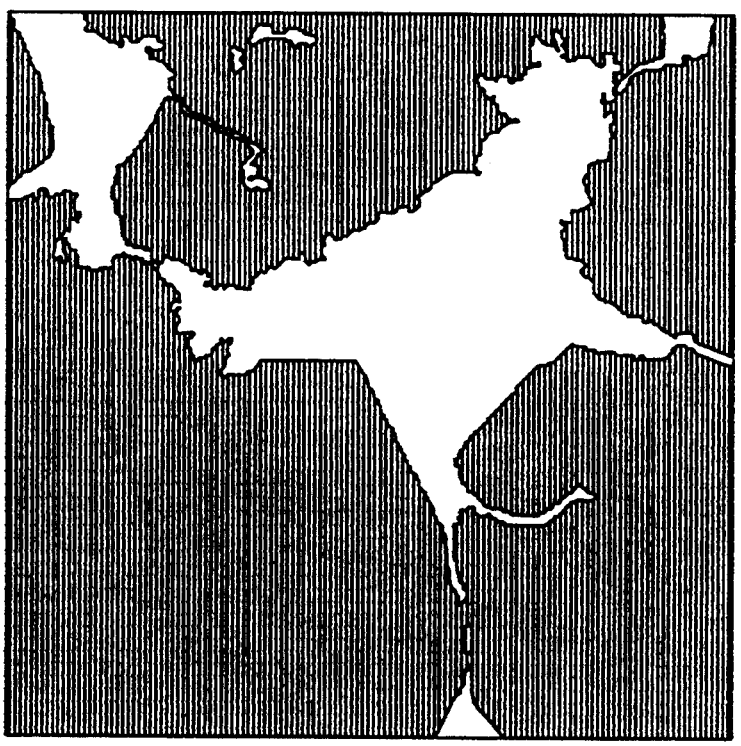
Figure 13C:
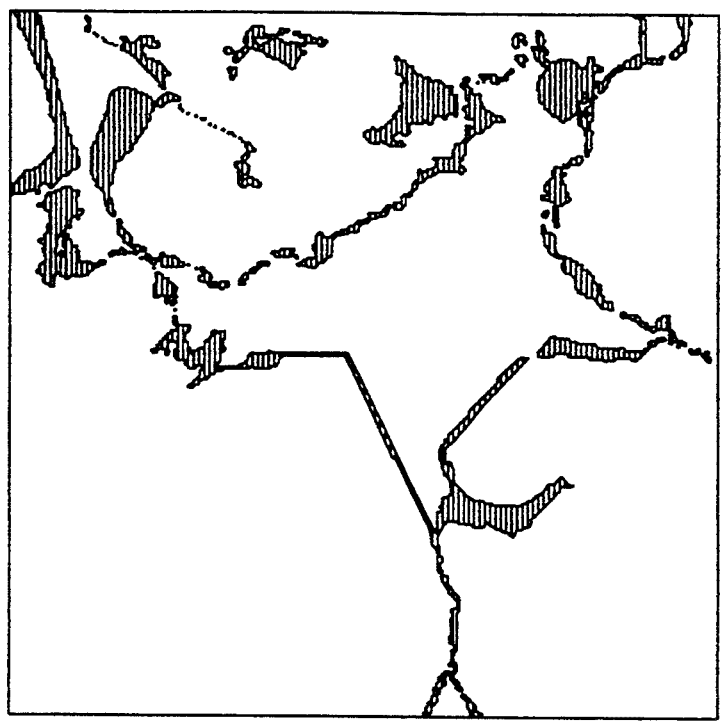

FIGS. 13a and 13b are 256×256 binary images of two adjacent sections. Interlayer spacing is approximately 20 pixel units of the sections. These two represent input arrays A and B. With help for the XORed image (shown FIG. 13c) of the two, the gap between two nonoverlapping narrow regions in the lower right quadrant was filled (gray area in FIG. 13c). These additional pixels make up an input array Z. Mid points of the Z boundary are added to the set of conditional points so that these will become one end of the skeleton. Other conditional points include intersections of boundaries of the regions A and B.

Figure 13D:
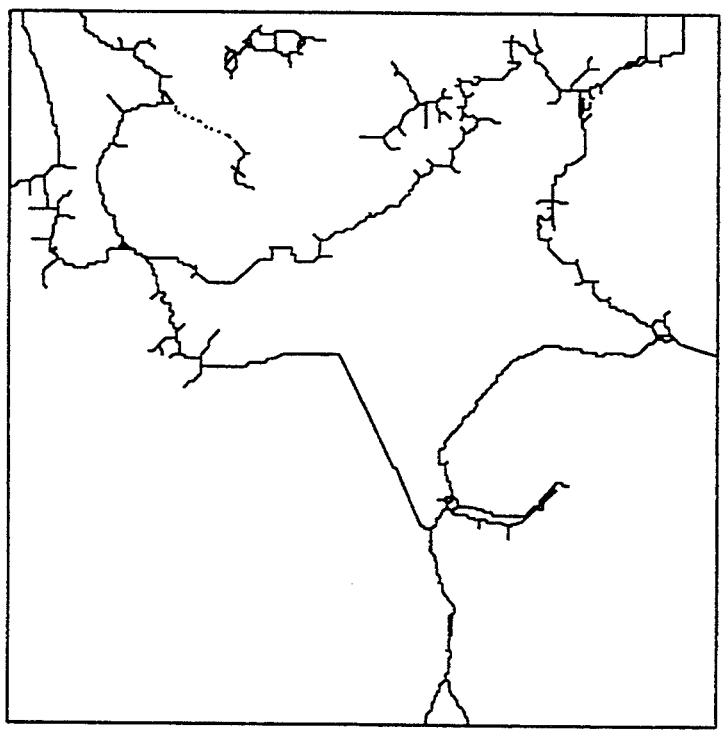
Figure 13E:
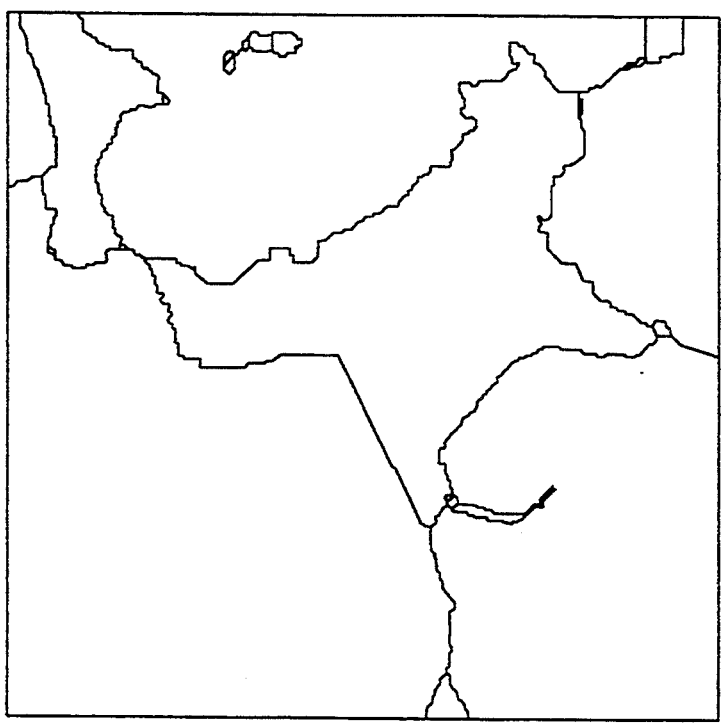
Figure 13F:
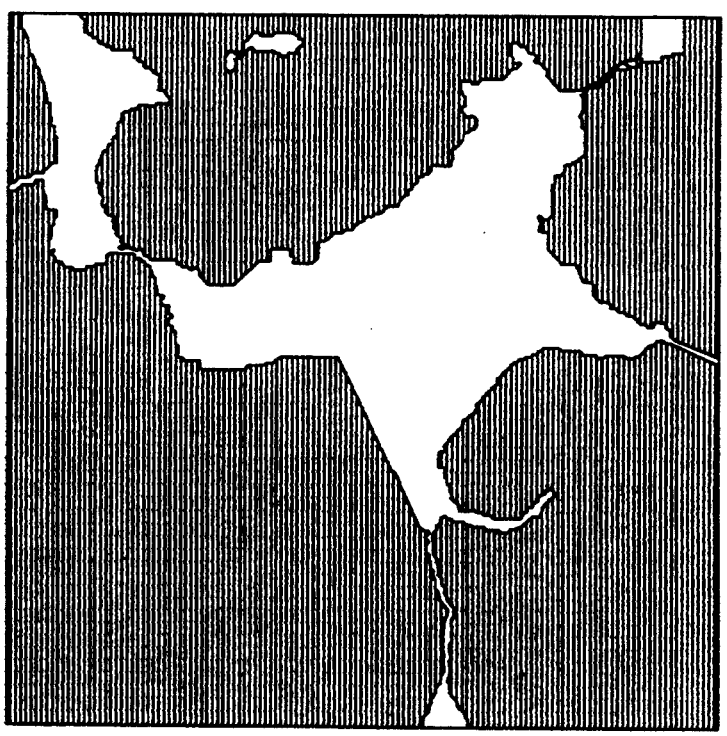

After a series of image-algebraic operations—erosion, complement, union, intersection and conditional skeleton—corresponding to the left two-thirds of the flow chart (FIG. 11), FIG. 13d was obtained. Although the general feature is acceptable, there are dangling branches. These branches were successfully removed by the conditional prune operation (FIG. 13e). By filling the contours, the middle layer configuration is obtained in FIG. 13f.

Figure 14A:
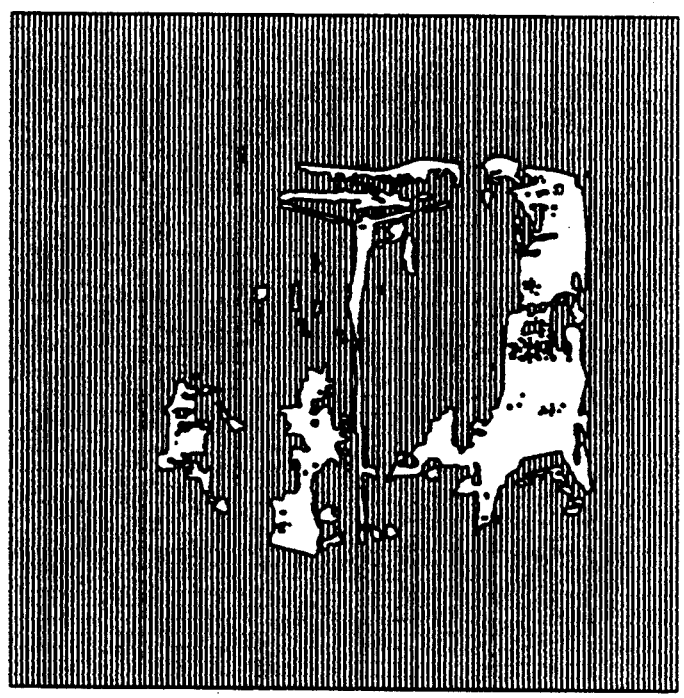
FIG. 14 is a rendering of the first preferred embodiment display.
Figure 14B:
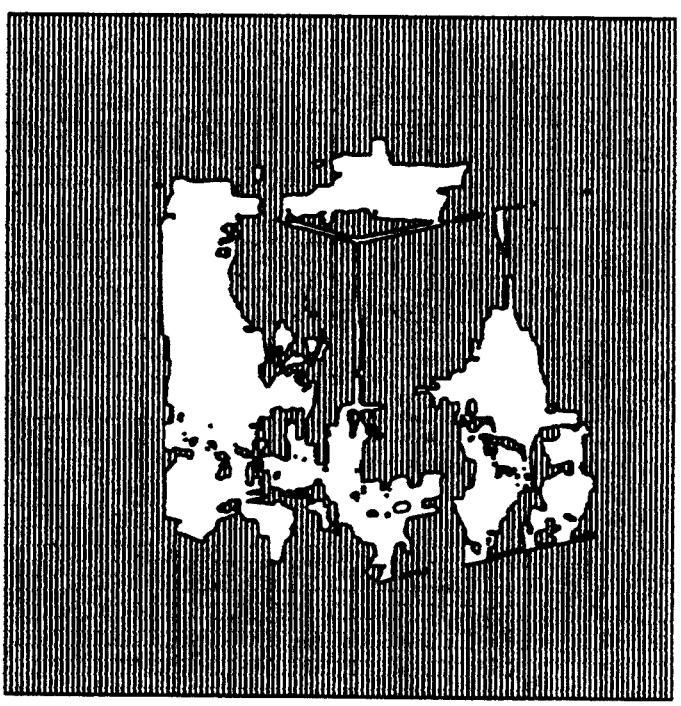

Similar procedures were applied to 16 serial cross sections, yielding 15 bisecting cross sections. Using these 31 sections, the three-dimensional pore structure was constructed and rendered (FIG. 14). The height of the cube is approximately 310 pixel units and the side edges are 256 units long. In the three-dimensional perspective views, the pores are shown as white and all volume elements in mineral grains are set to be fully transparent. Thus the first preferred embodiment method yields the first preferred embodiment display.

A second preferred embodiment method follows the first preferred embodiment method but fills the union of the conditional skeletons prior to pruning, and thus once the interior is filled, even the conditional points can be pruned away. Alternatively, a filled union of conditional skeletons could be eroded once rather than pruned to eliminate the branches and then dilated once to return.

A third preferred embodiment method repeats the other preferred embodiment methods to form further interpolation sections. In particular, if the first and second original cross sections contained regions A and B, respectively, and if the middle interpolation cross section contained middle region M derived from A and B, then the third preferred embodiment method also generates a second interpolation section between the first section and the middle section and containing a region derived from A and M. Of course, a third interpolation section between the middle section and the second section and containing a region derived from M and B, and further interpolating sections between any two of the preceding sections and with regions derived from the corresponding regions are also possible.

A fourth preferred embodiment method employs a relative distance function for the cells in A/B and B/A in place of the skeleton to define boundaries for interpolation sections. This permits simultaneous determination of multiple interpolation sections 104 between two starting cross sections 102 rather than the repetitive bisectioning as in the third preferred embodiment. In particular, consider a three dimensional object. To describe the object, we define a three-dimensional array of cells with binary variables, 1 or 0.

$(i,j,k) = 1$ if the cell is inside or on the object.
$(i,j,k) = 0$ if the cell is outside the object.

Then the object and the pore space outside the object are given by a set of cells:

Object = $\{(i,j,k):(i,j,k)=1\}$

Pore = $\{(i,j,k):(i,j,k)=0\}$

Assuming that there are n interpolation sections 104 between first and second cross sections 102, we have, First Cross Section = $\{(i,j,k): k = 0\}$
Inter Layer1 = $\{(i,j,k): k = 1\}$
Inter Layer2 = $\{(i,j,k): k = 2\}$
.
.
Inter Layer $n$ = $\{(i,j,k): k = n\}$
Second Cross Section = $\{(i,j,k): k = n+1\}$ The problem is now more specifically described as: Find the cell content (i,j,k) for k=1,2, . . . ,n, when (i,j,k) is known for the two cross sections k=0 and k=n+1.

Projection. In three dimensions, the First and Second cross sections are at different heights. To superimpose them, we project along the third axis simply by dropping the third index.

Second Cross Section = $\{(i,j,k): k=n+1\}$

Projection (Second Cross Section) = $\{(i,j):(i,j)\}$

On the projected plane, we further define a region as a set of cells with the value 1. Upper case letters, A, B, etc. are used to designate a region.

A = $\{(i,j):(i,j)=1\}$

Figure 5:
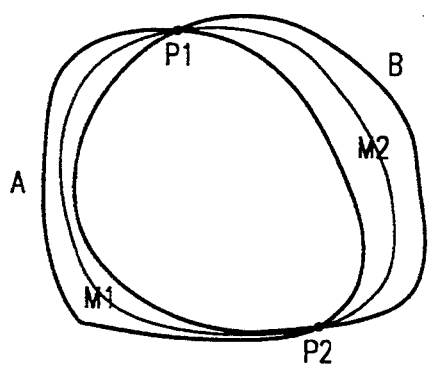

We first consider the case in which regions A and B are not very different, i.e., Regions A and B overlap in many cells on the projection, as for FIG. 5 of the first preferred embodiment. An assumption in 3-D reconstruction is that the object gradually changes its shape. On the projected plane this assumption means that, as the height of the interlayer changes from the First Cross Section to the Second Cross Section, outlines of the object will move from that of A toward that of B but will not go into the area outside both regions A and B. Thus we consider only three areas as possible locations of projected cells of interlayers.

Cells inside $A$ and inside $B$: $A \cap B = \{(i,j):(i,j) \text{ in } A, (i,j) \text{ in } B\}$
Cells inside $A$ but outside $B$: $A/B = \{(i,j):(i,j) \text{ in } A, (i,j) \text{ not in } B\}$
Cells inside $B$ but outside $A$: $B/A = \{(i,j):(i,j) \text{ in } B, (i,j) \text{ not in } A\}$ Consider, for example, a cell (i,j) that belongs to the area inside A but outside B. This cell is a projection of (i,j,k) along the third axis.

$(i,j)$ in $A/B$ $$(i,j,k) = \begin{cases} 1 \text{ for First Cross Section} & \text{or } k = 0 \\ 0 \text{ for Second Cross Section} & \text{or } k = n+1 \end{cases}$$

As the index k increases from 0, the cell value (i,j,k) changes from 1 to 0 after a certain value of k (say k=p).

$$(i,j,k) = \begin{cases} 1 \text{ for } k \leq p \\ 0 \text{ for } k \geq p+1 \end{cases} \text{ where } 0 \leq p \leq n$$

The location of this transition is of the primary interest. We assume that the closer the cell is to the boundary of A, the earlier the transition is (or the smaller the value p is). In other words, the distance from the boundary of A in the projection is translated to the layer position in the three dimension. Recall that the boundary of A was defined in the first preferred embodiment.

A distance map. The first problem is to find a distance between a given cell (i,j) and a boundary which consists of a set of cells. We defined the distance as the shortest among all possible distances to the boundary from the cell.

$D_A(i,j) = \min[\text{distance}[(i,j),(p,q)] \text{ for all } (p,q) \text{ in } A]$ Borgefors, *Distance Transformations in Digital Images*, 34 Computer Vision, Graphics, and Image Processing 344 (1986), discussed this type of problem in the more general context of distance transforms. If a distance to a boundary is computed in this way, piece-by-piece, for all cells in the region, a computation of distances is repeated N×M times, where N and M are the number of cells in the region and on the boundary, respectively. There is, however, a much better method for this purpose if the definition of the distance is simplified.

One simplified measure to characterize a distance between cells in the square grid is a sum of horizontal and vertical offsets—sometimes called as a city block distance as opposed to the true Pythagorean distance.

The simplified distance works as follows. First, mark cells on the boundary as 0 and the others by some distinguishable values, e.g. negative. Then starting with cells on the boundary, all neighbor cells will be marked as 1 if they are not on the boundary. A collection of cells with the label 1 forms a curve or a front that is in the unit distance from the boundary. Next, for all cells with the label 1, set all neighbor cells to 2 if their cell labels are not either 0 or 1. Continue the same procedure until all cells are labeled. A resulting map will yield a shortest distance to the boundary for each cell because, if a cell has been already labeled, that cell can be reached with a fewer steps than the currently expanding step value.

A meaning of a neighborhood in the square grid varies slightly depending on the connection mode. For a square grid, a neighbor cell can be defined as either four closest cells or eight cells including diagonal second nearest cells,

```
    1         1 1 1
1 0 1 or  1 0 1
    1         1 1 1
``` with the current cell at the center of the 3×3 matrix. If the original boundary was represented in the four-connected mode, it is desirable to keep any equidistance front also in the four-connected mode. To satisfy this requirement, a template that is complementary to the connection mode must be used—i.e., a template

```
    1
1 0 1
    1
``` for the eight-connected mode and a template

```
1 1 1
1 0 1
1 1 1
``` for the four-connected mode (See FIGS. 15a-b for examples).

A program to compute the distance map is given as follows:

---
Algorithm Distance_from_border:

%Definition
(neighbor of i,j) is 4 nearest-neighbor cells if the boundary is defined by 8-connected mode and 8 nearest-neighbor cells if the boundary is defined by 4-connected mode (It must be complementary to the connection mode).
open is any unique integer to indicate a condition that a given cell is open for expansion, e.g., a negative integer.
closed is any unique integer to indicate a condition that a given cell is not available for expansion, e.g., a positive number larger than maxdistance.
maxdistance is the expected maximum value of the iteration.

---
-continued
Algorithm Distance_from_border:

%Initialization
Set $D_A(i,j) = 0$ for all cells on the boundary A.
Set $D_A(i,j) =$ open for all cells between boundaries A and B but not on the boundaries.
Set $D_A(i,j) =$ closed for all other cells.
Set n = 0
Set change = logical true
%Iteration
do while (change = logical true)
n = n + 1
if n > maxdistance then exit to overflow
change = logical false
do for (i,j) for which $D_A(i,j) = n - 1$
  if $D_A$(neighbor of i,j) = open then
    $D_A$(neighbor of i,j) = n
    change = logical true
  endif
enddo
enddo
end
%ErrorExit
Overflow:
end
End of Algorithm Distance from border

---

Figures 16B, 16C:
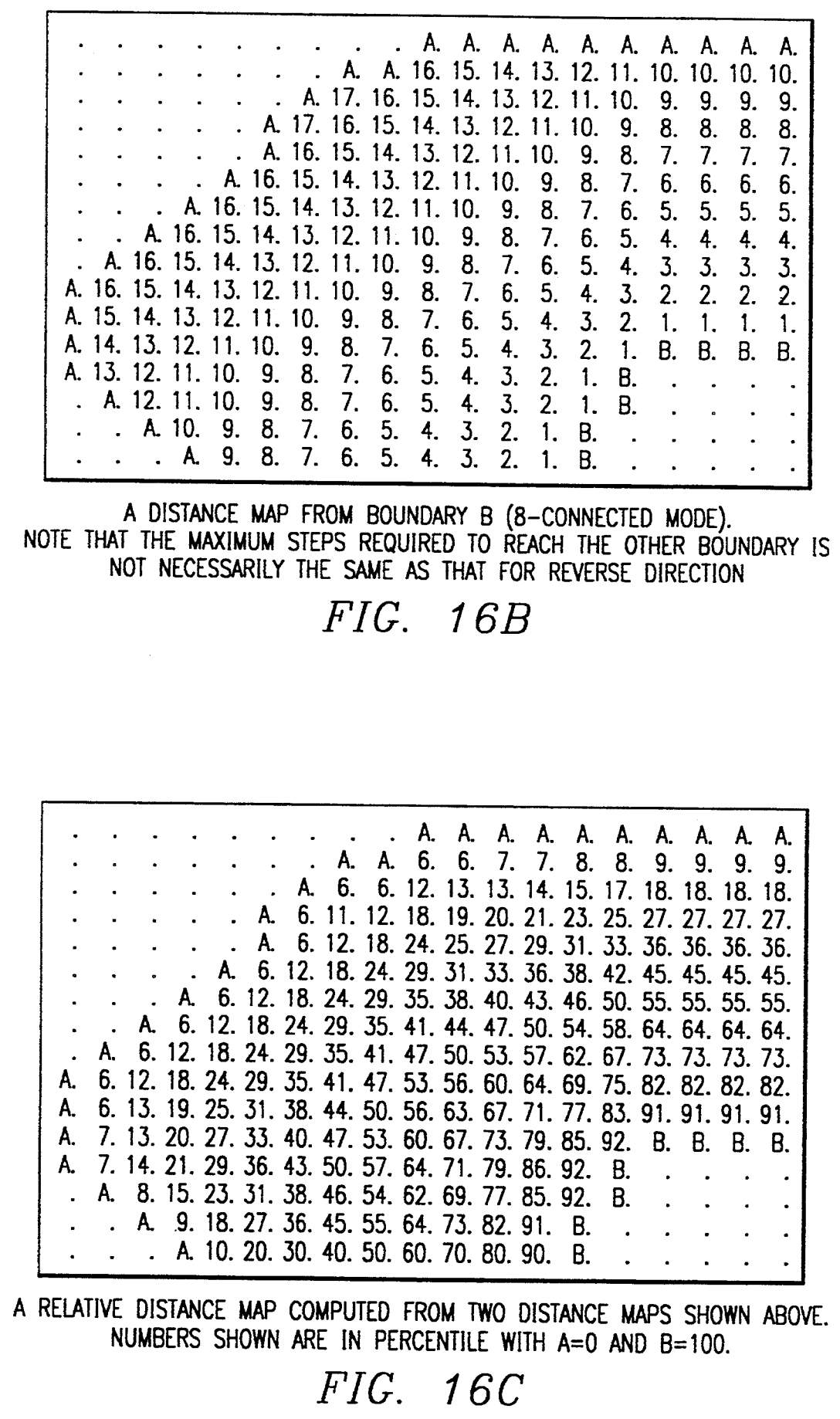

A numerical example is shown by FIGS. 16a-b.

A relative distance map. A given cell (i,j) located between the two boundaries of A and B is at a distance $D_A(i,j)$ from the boundary of A and $D_B(i,j)$ from the boundary of B. A relative location of the cell between boundaries A and B, measured from the boundary A, is defined by $$D_{AB}(i,j) = \begin{cases} \dfrac{D_A(i,j)}{D_A(i,j) + D_B(i,j)} & \text{if } D_A(i,j) + D_B(i,j) \neq 0 \\ 0 & \text{if } D_A(i,j) = D_B(i,j) = 0 \end{cases}$$

The latter condition holds when boundaries A and B coincide at that cell. Obviously the range of the relative distance $D_{AB}(i,j)$ is $$0 \leq D_{AB}(i,j) \leq 1.0$$

FIG. 16c shows a relative distance map computed for the example given in FIGS. 16a-b and with the relative distance expressed as a percentage.

Figure 17A:
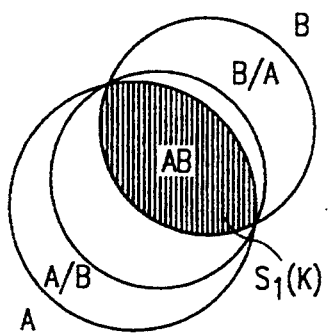
FIGS. 17a–d show projected regions.

Generation of interlayers. Let us next consider to generate, from the relative distance map, the configuration of the k-th layer of n equally spaced layers between layers A and B (the index k increases from Section A toward Section B). There are three cases:

Case 1. In the area A∩B; see FIG. 17a.
First of all, if a cell (i,j) is occupied by the object both in Region A and Region B, i.e., in three dimension, (i,j,0)=1 and (i,j,n+1)=1, then we assume the object exists for all interlayers, (i,j,k)=1, for k=1,2, ... ,n. In other words, all cells in the intersection between A and B are in the object body, and thus if A∩B≠φ, then a set $S_1(k)$ represents a part of the 3-D object at the k-th layer.

$$S_1(k) = \{(i,j):(i,j) \text{ in } A \cap B\}$$

Because the righthand side does not include k, this subset is identical for all interlayers.

Figure 17B:
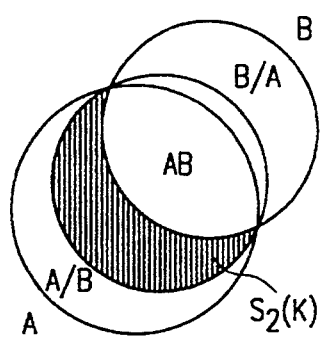

Case 2. In the area A/B; see FIG. 17b.

This is the case where Region A is larger than Region B. As the layer index increases, the object size decreases from Region A toward Region B boundary. Cells in the k-th layer should have a relative distance between $$\frac{k}{n+1}$$

and 1, the latter being the boundary B.

$$S_2(k) = \left\{ (i,j): D_{AB}(i,j) \geq \frac{k}{n+1} \right\} \text{for } A/B$$

Note that the righthand side does include a term k. This subset decreases in its size as k increases.

Figure 17C:
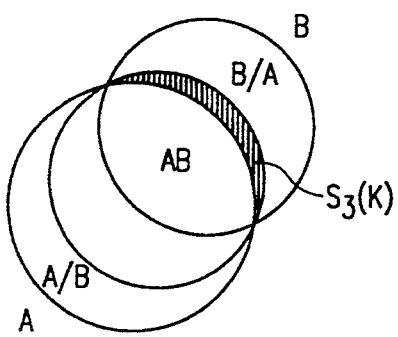

Case 3. In the area B/A; see FIG. 17c.

As the layer index k increases, the object size increases from the boundary A toward the boundary B. Cells in the k-th layer should have a relative distance between 0 and $$\frac{k}{n+1},$$

the former being the boundary A.

$$S_3(k) = \left\{ (i,j): D_{AB}(i,j) \leq \frac{k}{n+1} \right\} \text{for } B/A$$

This subset increases in its size as k increases.

Figure 17D:
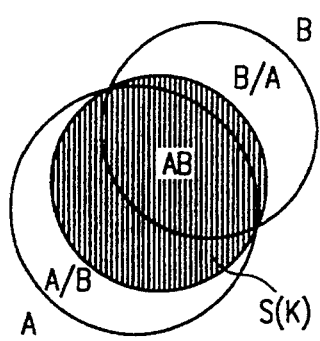

Then the configuration of the k-th layer is given by unions of the above three subsets as shown in FIG. 17d.

$$S(k) = S_1(k) \cup S_2(k) \cup S_3(k)$$

Figure 18A:
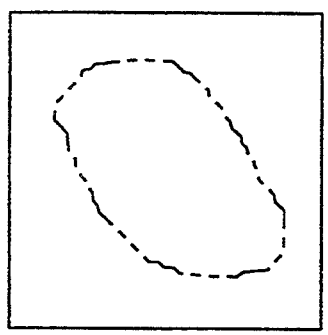
FIGS. 18a–h illustrate the fourth preferred embodiment.
Figure 18B:
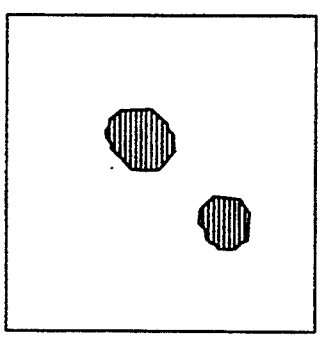
Figure 18C:
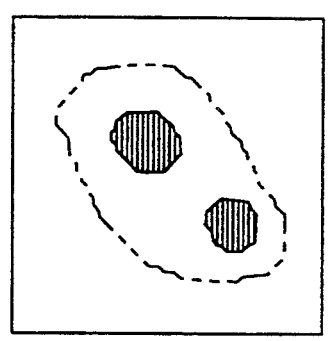
Figure 18D:
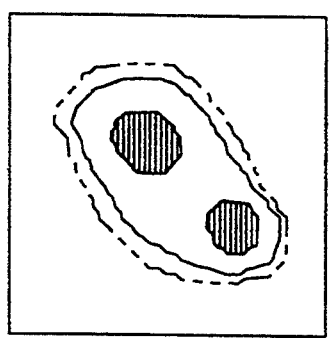
Figure 18E:
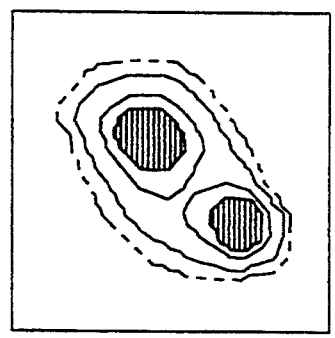
Figure 18F:
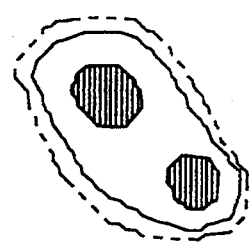
Figure 18G:
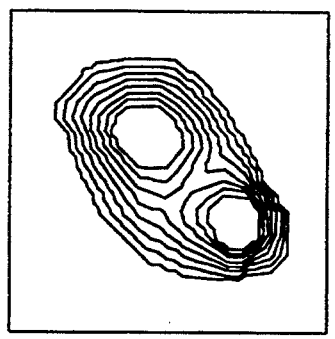
Figure 18H:
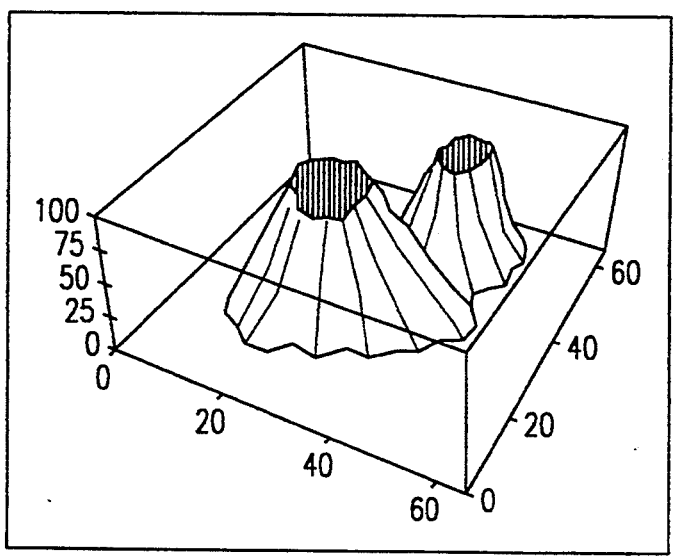

FIGS. 18a–h illustrate the case of B contained in A. In particular, FIG. 18g shows the sections S(k) for k=0,1, ...,7, and FIG. 18h a three-dimensional perspective.

Figure 19:
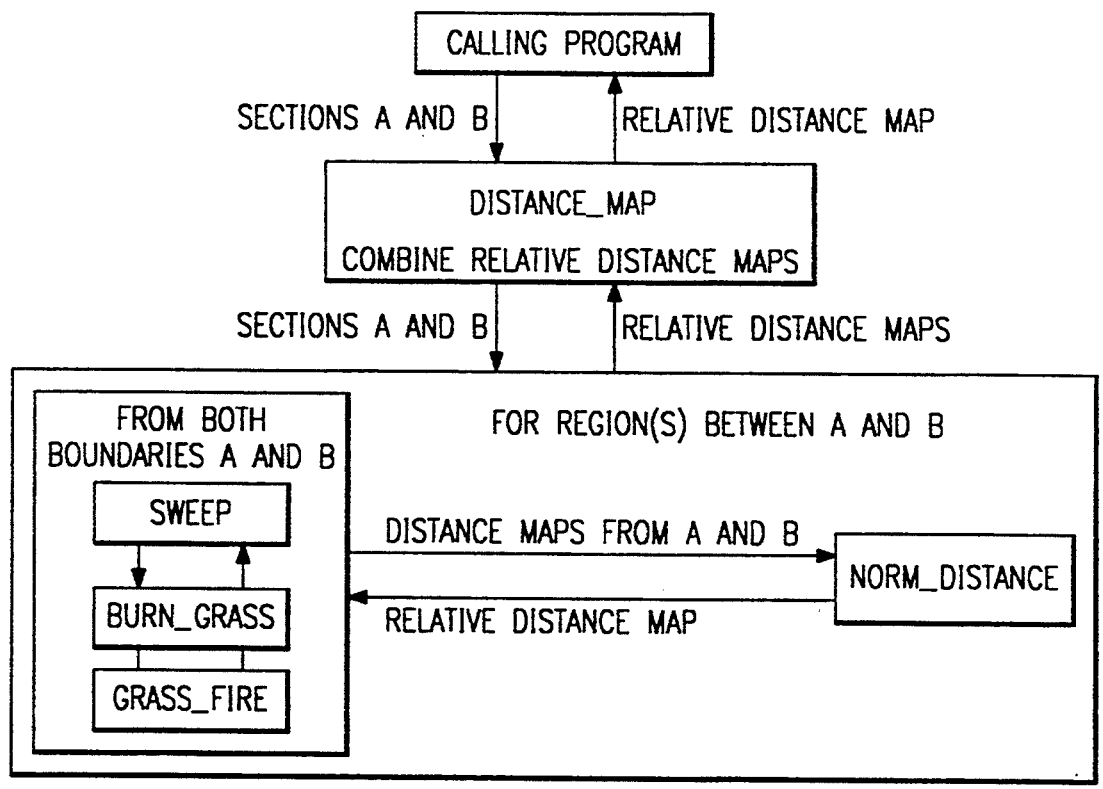
FIG. 19 shows data flow.

Intuitive interpretation of the new method. The new method described here uses a concept of a relative distance to the boundaries. The best analogy is a fire front spreading at a constant speed on a dry grass field, a part of which is protected by a barrier. The fire front sweeps the field until it eventually reaches the other boundary or a barrier. For a given point in the field, its distance from the starting boundary is defined as the time it takes the fire to reach that point. By reversing the starting and ending boundaries, we can also measure the distance from the other boundary. If we know how far a specified cell is located from both boundaries, a relative distance of the cell between the two boundaries can be computed. FIG. 19 illustrates the data flow of the relative distance computation.

Augmented regions. When the regions A and B do not overlap very much or at all, an augmented region Z may be created as has been done previously in the first preferred embodiment; also see Ohashi, in Pflug et al (Ed), *Proceedings of Symposium on Three-dimensional Computer Graphics in Modeling Geologic Structures and Simulating Geological Processes*, Pergamon Press (to be published).

Again we have three areas for possible cells of the object on interlayers.

$$A \cap B$$

$$A \cup Z/B$$

$$B \cup Z/A$$

Figure 20A:
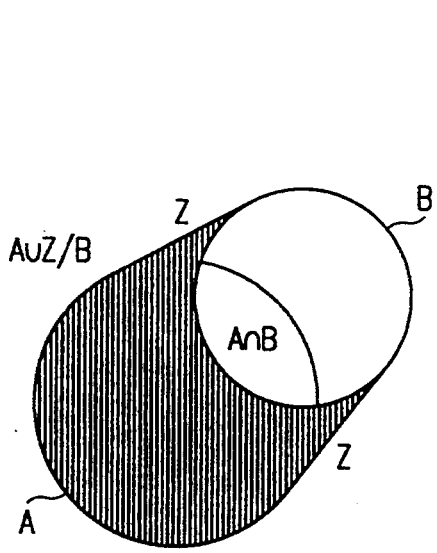
FIGS. 20a–b indicate augmented regions.
Figure 20B:
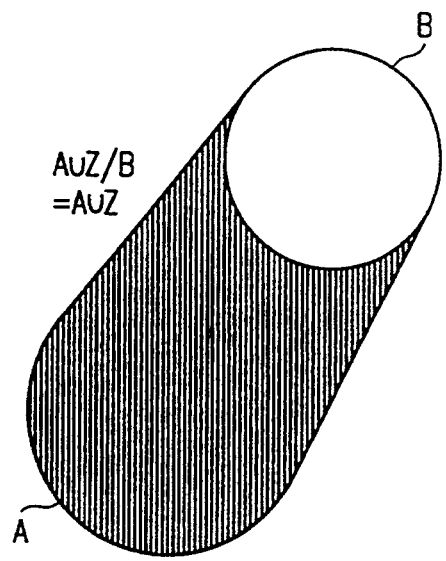

The first case is the same as before. The second and third cases can be handled simply by adding the region Z. Then the same procedure described above can be applied. See FIGS. 20a–b illustrating regions Z for the cases of some overlap of A and B and no overlap.

However, the use of the augmented region Z may be more easily described if we use two symmetrical relative distance measures. Indeed, define the relative distance $D_{A*B}$ in the same manner as $D_{AB}$ but with A replaced by $A \cup Z$ and the boundary of A restricted to that portion not abutting Z or B, so for cells in $A \cup Z$ the relative distance $D_{A*B}$ indicates distance from the portion of the boundary of A away from B and Z to the boundary of B. Similarly, define the relative distance $D_{B*A}$ in the same manner as $D_{A*B}$ with A and B interchanged, so this indicates the distance of cells in $B \cup Z$ from the portion of the boundary of B away from A and Z to the boundary of A. Then form the interpolation sections by the analog of the $S_j$ of the unaugmented case:

$$S^*_1(k) = A \cap B$$

$$S^*_2(k) = \left\{ (i,j): D_{A*B}(i,j) \geq \frac{k}{n+1} \right\} \text{for } A/B$$

$$S^*_3(k) = \left\{ (i,j): D_{B*A}(i,j) \geq 1 - \frac{k}{n+1} \right\} \text{for } B/A$$

$$S^*_4(k) = \left\{ (i,j): D_{A*B}(i,j) \geq \frac{k}{n+1} \text{ and } D_{B*A}(i,j) \geq 1 - \frac{k}{n+1} \right\} \text{for } Z$$

As before, the k-th interpolation section is the union:

$$S^*(k) = S^*_1(k) \cup S^*_2(k) \cup S^*_3(k) \cup S^*_4(k)$$

Figure 21A:
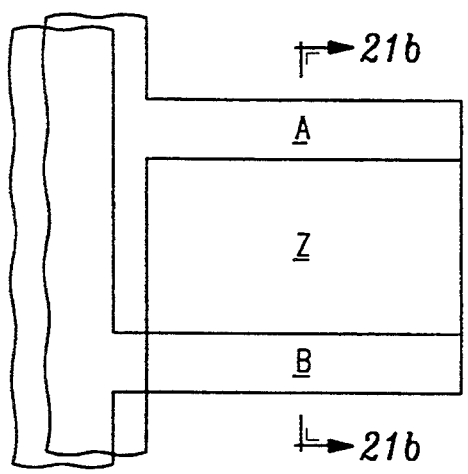
FIGS. 21a–d illustrate the augmented region effect.
Figure 21B:
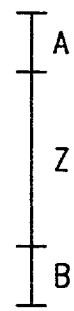
Figure 21C:
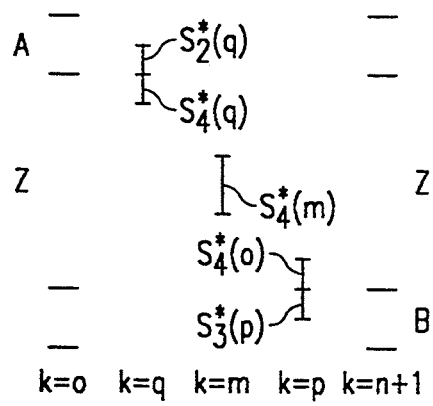
Figure 21D:
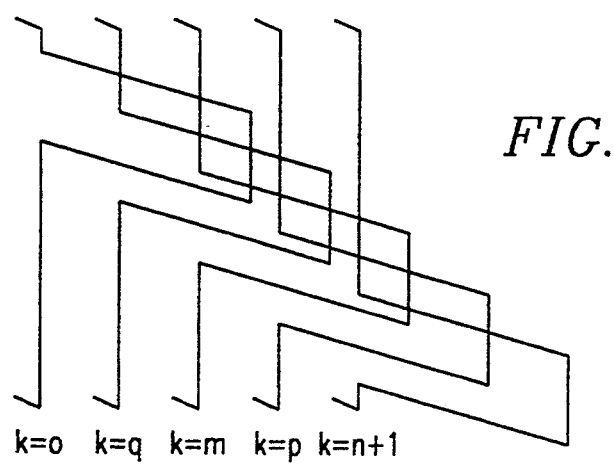

FIGS. 21a–d illustrate interpolation sections for the regions A and B of FIGS. 12a–c. FIG. 21a is the projection of the first and second cross sections which define the regions A and B; and FIG. 21b shows the one-dimensional slice along line b—b in projection FIG. 21a. FIG. 21c indicates the interpolation as a function of the k variable; this clarifies the various inequalities as to the cells in region Z relating to membership in an interpolation section. Note that for k=1 the section is made of $S^*_2(q) \cup S^*_4(q)$ with $S^*_1(q)$ and $S^*_3(q)$ both empty, for k=m the section is just $S^*_4(m)$ with the other $S^*$ empty, and for k=p the section is made of $S^*_3(p) \cup S^*_4(p)$ with $S^*_1(p)$ and $S^*_2(p)$ both empty. FIG. 21d is a perspective view of the three dimensional interpolated structure.

A listing of the distance map programs appears in the Appendix.

The relative-distance-map method has the following advantages over the bisection method.

1. More natural branching. If branching occurs, the location of a split does not have to be assumed at the bisecting plane as in the first preferred embodiment. The narrower the gap between two separated regions on one cross section, the closer to the level the split point is located. Furthermore, the valley between two branches smoothly changes its height toward the base or root of the object.
2. Enhanced computation speed. With approximately the same order of computation time for a single bisection layer, the fourth preferred embodiment will produce a distance map which includes necessary information for all n interlayers.
3. No restriction on the number of interlayers. The distance map method will generate as many interpolated layers as specified between two given cross sections. The number of interpolations need not to be $(2^n-1)$ where n=integer. For example, if the spacing of the original serial cross sections varies, the spacing of interpolated layers can be kept reasonably uniform by selecting appropriate numbers of interpolations.

A fifth preferred embodiment method uses the Pythagorean distance in place of the city block distance of the fourth preferred embodiment but otherwise follows its steps.

Modifications and Variations

Various modifications of the preferred embodiments retain the feature of forming the (conditional) skeleton of the difference of regions A and B to be used as the boundary of the interpolation region M, and exemplary modifications include: higher dimensional regions may be interpolated, use of continuous rather than digitized images (the skeleton operation is still defined), form the skeleton of $A/(B^e)^c \cup B/(A^e)^c$ rather than the conditional skeleton of each separately, use $A^d/B^c$ in place of $A/(B^e)^c$, and so forth.

APPENDIX ia_fortan_code:ia_image.f.lst

Listing from Language Systems FORTRAN (Version 2.0 January 23, 1990)
      Thu, Oct 4, 1990    4:31 PM
Options OFF: A ANSI B C CASE CCD CCX DYN E EXTENDED F77 I2 MC68020 MC68881 OV R S
Options ON:  3 L OPT=1 Z

```
0001     c----------------------------------------------------------------
0002              subroutine clear_image (buf1)
0003     c----------------------------------------------------------------
0004     c    clear buf1
0005     c
0006              implicit none
0007              include 'ia.inc'
0008              integer*1   buf1(0:i_size+1,0:j_size+1)
0009
0010              integer*2   i,j
0011
0012              do i=1,i_size
0013                  do j=out_start_col,out_end_col
0014                      buf1(i,j)=off
0015                  enddo
0016              enddo
0017              return
0018              end
0019     c----------------------------------------------------------------
0020              subroutine copy_image (buf1,buf2)
0021     c----------------------------------------------------------------
0022     c    copy buf1 to buf2
0023     c
0024              implicit none
0025              include 'ia.inc'
0026              integer*1   buf1(0:i_size+1,0:j_size+1)
0027              integer*1   buf2(0:i_size+1,0:j_size+1)
0028
0029              integer*2   i,j
0030
0031              do i=1,i_size
0032                  do j=out_start_col,out_end_col
0033                      buf2(i,j)=buf1(i,j)
0034                  enddo
0035              enddo
0036              return
0037              end
0038     c----------------------------------------------------------------
0039              subroutine not_image (buf1,buf2)
0040     c----------------------------------------------------------------
0041     c    negate buf1 to buf2
0042     c
0043              implicit none
0044              include 'ia.inc'
0045              integer*1   buf1(0:i_size+1,0:j_size+1)
0046              integer*1   buf2(0:i_size+1,0:j_size+1)
0047
0048              integer*2   i,j
```

```
0049
0050            do i=1,i_size
0051               do j=out_start_col,out_end_col
0052                  buf2(i,j)=.not.buf1(i,j)
0053               enddo
0054            enddo
0055            return
0056            end
0057    c------------------------------------------------------------
0058            subroutine or_images (buf1,buf2,buf3)
0059    c------------------------------------------------------------
0060    c   pixel wise OR operations
0061    c
0062            implicit none
0063            include 'ia.inc'
0064            integer*1   buf1(0:i_size+1,0:j_size+1)
0065            integer*1   buf2(0:i_size+1,0:j_size+1)
0066            integer*1   buf3(0:i_size+1,0:j_size+1)
0067
0068            integer*2   i,j
0069
0070            do i=1,i_size
0071               do j=out_start_col,out_end_col
0072                  buf3(i,j)=buf1(i,j).or.buf2(i,j)
0073               enddo
0074            enddo
0075            return
0076            end
0077    c------------------------------------------------------------
0078            subroutine and_images (buf1,buf2,buf3)
0079    c------------------------------------------------------------
0080    c   pixel wise AND operations
0081    c
0082            implicit none
0083            include 'ia.inc'
0084            integer*1   buf1(0:i_size+1,0:j_size+1)
0085            integer*1   buf2(0:i_size+1,0:j_size+1)
0086            integer*1   buf3(0:i_size+1,0:j_size+1)
0087
0088            integer*2   i,j
0089
0090            do i=1,i_size
0091               do j=out_start_col,out_end_col
0092                  buf3(i,j)=buf1(i,j).and.buf2(i,j)
0093               enddo
0094            enddo
0095            return
0096            end
0097    c------------------------------------------------------------
0098            subroutine xor_images (buf1,buf2,buf3)
0099    c------------------------------------------------------------
0100    c   pixel wise XOR operations
0101    c
0102            implicit none
0103            include 'ia.inc'
0104            integer*1   buf1(0:i_size+1,0:j_size+1)
0105            integer*1   buf2(0:i_size+1,0:j_size+1)
0106            integer*1   buf3(0:i_size+1,0:j_size+1)
0107
0108            integer*2   i,j
0109
0110            do i=1,i_size
0111               do j=out_start_col,out_end_col
0112                  buf3(i,j)=buf1(i,j).xor.buf2(i,j)
0113               enddo
0114            enddo
0115            return
0116            end
0117
0118
0119    c------------------------------------------------------------
0120            subroutine erode_image (buf1,buf2)
0121    c------------------------------------------------------------
0122    c
0123    c   erosion operation
0124    c
```

```
0125   c                             1                               1 1 1
0126   c           mode=0         1 1 1         mode.ne.0         1 1 1
0127   c                             1                               1 1 1
0128   c
0129         implicit none
0130         include 'ia.inc'
0131         integer*1 buf1(0:i_size+1,0:j_size+1)
0132         integer*1 buf2(0:i_size+1,0:j_size+1)
0133         integer*2   i,j,k,mode_step
0134         integer*1 ichain(0:7)   /0,-1,-1,-1, 0, 1, 1, 1/    ! row locations
0135         integer*1 jchain(0:7)   /1, 1, 0,-1,-1,-1, 0, 1/    ! column locatio
0136
0137         if(connect_mode.eq.0) then
0138             mode_step = 2
0139         else
0140             mode_step = 1
0141         endif
0142
0143         call turn_margin_on (buf1)
0144         nhit=0
0145         do i=1,i_size
0146           do j=1,j_size
0147
0148             if(buf1(i,j)) then
0149                do k=0,7,mode_step
0150                   if(.not.buf1(i+ichain(k),j+jchain(k))) then
0151                      nhit=nhit+1
0152                      if(nhit.gt.maxhit) then
0153                         write(*,'('' A hit table overflows. '')')
0154                         call exit
0155                      endif
0156                      i_hit(nhit)=i
0157                      j_hit(nhit)=j
0158                      go to 200            ! no need to check for the rest
0159                   endif
0160                enddo
0161   200       continue
0162             endif
0163           enddo
0164         enddo
0165
0166         if(nhit.gt.0) then
0167            write(*,'('' erosion nhits '',i5)') nhit
0168   d        pause
0169            do j=1,nhit
0170               buf2(i_hit(j),j_hit(j))=off
0171            enddo
0172         endif
0173         call turn_margin_off(buf1)
0174         return
0175         end
0176   c------------------------------------------------------------
0177         subroutine dilate_image (buf1,buf2)
0178   c------------------------------------------------------------
0179   c
0180   c   dilation operation
0181   c
0182   c
0183   c                             1                               1 1 1
0184   c        connect_mode=0     1 1 1        connect_mode.ne.0  1 1 1
0185   c                             1                               1 1 1
0186   c
0187   c
0188         implicit none
0189         include 'ia.inc'
0190         integer*1 buf1(0:i_size+1,0:j_size+1)
0191         integer*1 buf2(0:i_size+1,0:j_size+1)
0192         integer*2   i,j,k, mode_step
0193         integer*1 ichain(0:7)   /0,-1,-1,-1, 0, 1, 1, 1/    ! row locations
0194         integer*1 jchain(0:7)   /1, 1, 0,-1,-1,-1, 0, 1/    ! column locatio
0195
0196         if(connect_mode.eq.0) then
0197             mode_step = 2
0198         else
0199             mode_step = 1
0200         endif
```

```
0201
0202              call turn_margin_on (buf1)
0203              nhit=0
0204              do i=1,i_size
0205                 do j=1,j_size
0206
0207                    if(buf1(i,j)) then
0208                       do k=0,7,mode_step
0209                          if(.not.buf1(i+ichain(k),j+jchain(k))) then
0210                             nhit=nhit+1
0211                             if(nhit.gt.maxhit) then
0212                                write(*,'('' A hit table overflows. '')')
0213                                call exit
0214                             endif
0215                             i_hit(nhit)=i+ichain(k)
0216                             j_hit(nhit)=j+jchain(k)
0217                          endif
0218                       enddo
0219                    endif
0220                 enddo
0221              enddo
0222
0223              if(nhit.gt.0) then
0224                 do j=1,nhit
0225                    buf2(i_hit(j),j_hit(j))=on
0226                 enddo
0227              endif
0228              call turn_margin_off(buf1)
0229              return
0230              end
0231
0232       c----------------------------------------------------------
0233              subroutine prune_image (buf1,buf2)
0234       c----------------------------------------------------------
0235       c   prune operation
0236       c
0237              implicit none
0238              include 'ia.inc'
0239              integer*1 buf1(0:i_size+1,0:j_size+1)
0240              integer*1 buf2(0:i_size+1,0:j_size+1)
0241
0242              logical*1   change
0243              integer*2   which,orient
0244              integer*2   N_templates
0245       *      integer*1   template_code(128)
0246       *      integer*1   neighbor_array(i_size,j_size)
0247              integer*2   pat1,pat2
0248
0249              if(connect_mode.eq.0) then
0250                 pat1=5                              ! 8-connected, patterns 5,6,7 &
0251                 pat2=8
0252              else
0253                 pat1=4                              ! 4-connected, pattern 4 only
0254                 pat2=4
0255              endif
0256
0257              call add_conditional (buf1)
0258
0259              call turn_margin_on (buf1)
0260              change=.true.                         ! at least one try
0261
0262              do while (change)
0263                 change=.false.
0264                 do orient=1,4                      ! for four orientations
0265                    do which=pat1,pat2              ! for pattern(s)
0266                       call set_template(which,orient)
0267                       call thin_image (change,buf1,buf2)
0268                       write(*,'('' pruning- orientation/pattern/nhit '',3i5)') ori
0269                    enddo
0270                 enddo
0271              enddo
0272              call turn_margin_off(buf1)
0273              return
0274              end
0275       c----------------------------------------------------------
0276              subroutine skeleton_image (buf1,buf2)
0277       c----------------------------------------------------------
```

```
0278    c   skelton operation
0279    c
0280            implicit none
0281            include 'ia.inc'
0282            integer*1 buf1(0:i_size+1,0:j_size+1)
0283            integer*1 buf2(0:i_size+1,0:j_size+1)
0284
0285            logical*1   change
0286            integer*2   which,orient
0287            integer*2   N_templates
0298            integer*2   mode_step
0289
0290            if(connect_mode.eq.0) then
0291                mode_step = 2                       ! 8-connected, patterns 1 & 3
0292            else
0293                mode_step = 1                       ! 4-connected, patterns 1 $ 2
0294            endif
0295
0296            call add_conditional (buf1)
0297            call turn_margin_on (buf1)
0298
0299            change=.true.                           ! at least one try
0300
0301            do while (change)
0302                change=.false.
0303
0304                do which=1,3,mode_step              ! for two patterns
0305                    do orient=1,4                   ! for four orientations
0306                        call set_template(which,orient)
0307                        call thin_image (change,buf1,buf1)
0308                        write(*,'('' skeleton- orientation/pattern/nhit '',3i5)') or
0309                    enddo
0310                enddo
0311            enddo
0312            call turn_margin_off (buf1)
0313
0314            return
0315            end
0316    c-----------------------------------------------------------------
0317            subroutine thin_image (change,buf1,buf2)
0318    c-----------------------------------------------------------------
0319
0320    c   thinning
0321    c
0322            implicit none
0323            include 'ia.inc'
0324            integer*1 buf1(0:i_size+1,0:j_size+1)
0325            integer*1 buf2(0:i_size+1,0:j_size+1)
0326
0327    c..arguments
0328            logical*1   change
0329    *       integer*2   N_templates
0330    *       integer*1   template_code(1)
0331    c..external
0332            logical is_in_cond_xy
0333            external is_in_cond_xy
0334    c..local
0335            integer*2   i,j,k
0336            nhit=0
0337
0338
0339            do i=1,i_size
0340                do j=1,j_size
0341
0342                    if (buf1(i,j) ) then
0343                        do k=1,ncheck
0344                            if(check(k).neqv.buf1(i+icheck(k),j+jcheck(k))) then
0345                                go to 200
0346                            endif
0347                        enddo
0348
0349                        if(is_in_cond_xy(i,j)) go to 200
0350
0351                        nhit=nhit+1
0352                        if(nhit.gt.maxhit) then
0353                            write(*,'('' A hit table overflows. '')')
0354                            call exit
```

```
0355                         endif
0356                         i_hit(nhit)=i
0357                         j_hit(nhit)=j
0358                 endif
0359    200      continue
0360           enddo
0361       enddo
0362
0363       if(nhit.gt.0) then
0364          change=.true.
0365          do k=1,nhit
0366             buf1(i_hit(k),j_hit(k))=0
0367          enddo
0368       endif
0369
0370       return
0371       end
0372 c----------------------------------------------------
0373       subroutine set_template (which,orient)
0374 c----------------------------------------------------
0375 c
0376 c
0377 c  set template to
0378 c
0379 c  1 1 1    or   1 1 x   or      x 1 x      x x x      0 x 0       x 0 0
0380 c  x 1 x         1 1 0           1 1 0      0 1 0      0 1 0       0 1 0
0381 c  0 0 0         x 0 x           x 0 0      0 0 0      0 0 0       0 0 0
0382 c
0383 c   pat.1         pat.2          pat.3      pat.4      pat.5       pat.6
0384 c  4/8-conn.    4-connect.    8-connect.  4-connect. 8-connect.  8-connect.
0385 c   thinning    thinning       thinning    pruning    pruning         pr
0386 c
0387 c
0388 c      x 1 x       1 x 0
0389 c      0 1 0       x 1 0
0390 c      0 0 0       0 0 0
0391 c       pat.7       pat.8
0392 c     8-connect.  8-connect.
0393 c      pruning     pruning
0394 c
0395 c  chain code index       3 2 1
0396 c                         4 8 0
0397 c                         5 6 7
0398       implicit none
0399       include 'ia.inc'
0400       integer*2   which,orient
0401       integer     maxpattern
0402       parameter   (maxpattern=8)
0403
0404       integer*1 ichain(0:7)  /0,-1,-1,-1, 0, 1, 1, 1/   ! row locations
0405       integer*1 jchain(0:7)  /1, 1, 0,-1,-1,-1, 0, 1/   ! column locatio
0406 c
0407
0408 c
0409 c.. cell content: 0=off, 1=on, -1=don't care
0410 c
0411       integer*1 pattern(0:7,maxpattern)
0412     1                          /-1, 1, 1, 1,-1, 0, 0, 0,   ! pattern 1
0413     2                            0,-1, 1, 1, 1,-1, 0,-1,   ! pattern 2
0414     3                            0,-1, 1,-1, 1,-1, 0, 0,   ! pattern 3
0415     4                            0,-1,-1,-1, 0, 0, 0, 0,   ! pattern 4
0416     5                            0,-1, 0, 0, 0, 0, 0, 0,   ! pattern 5
0417     6                            0, 0, 0,-1, 0, 0, 0, 0,   ! pattern 6
0418     7                            0,-1, 1,-1, 0, 0, 0, 0,   ! pattern 7
0419     8                            0, 0,-1, 1,-1, 0, 0, 0/   ! pattern 8
0420
0421
0422       integer*2   turn
0423       integer*2   i,j,k
0424
0425 c
0426 c  turn rotates template clockwise
0427 c  which is equivalent to counter-clockwise rotation of chain code
0428 c  : chain code   0->2, 1 -> 3, 2->4, .. 5->7, 6 ->0, 7 -> 1
0429 c
0430       if(which.le.0.or.which.gt.maxpattern.or.orient.le.0.
```

```
0431            1   or.orient.gt.4) then
0432                    write(*,'('' arguments out of range - set_template '',2i5)')
0433            1       which,orient
0434                return
0435              endif
0436
0437              turn=2*(orient-1)
0438
0439              k=0
0440              do i=0,7
0441                  if(pattern(i,which).ge.0) then
0442                      k=k+1
0443                      j=mod((i+turn), 8)
0444                      icheck(k)=ichain(j)
0445                      jcheck(k)=jchain(j)
0446                      check(k)= pattern(i,which)
0447                  endif
0448              enddo
0449              ncheck = k
0450              return
0451              end
0452     c-----------------------------------------------------------
0453              subroutine turn_margin_on (buf)
0454     c-----------------------------------------------------------
0455              implicit none
0456              include 'ia.inc'
0457              integer*1   buf(0:i_size+1,0:j_size+1)
0458              integer*1   target
0459              parameter   (target='ff'x)
0460
0461              call set_margin (target,buf)
0462              return
0463              end
0464     c-----------------------------------------------------------
0465              subroutine turn_margin_off (buf)
0466     c-----------------------------------------------------------
0467              implicit none
0468              include 'ia.inc'
0469              integer*1   buf(0:i_size+1,0:j_size+1)
0470              integer*1   target
0471              parameter   (target=0)
0472
0473              call set_margin (target,buf)
0474              return
0475              end
0476
0477     c-----------------------------------------------------------
0478              subroutine cycle_margin (buf)
0479     c-----------------------------------------------------------
0480              implicit none
0481              include 'ia.inc'
0482              integer*1 buf(0:i_size+1,0:j_size+1)
0483              integer*2 k
0484
0485              buf(0,0)                = buf(i_size,j_size)
0486              buf(0,j_size+1)         = buf(i_size,1)
0487              buf(i_size+1,0)         = buf(1,j_size)
0488              buf(i_size+1,j_size+1)  = buf(1,1)
0489
0490              do k=0,i_size+1
0491                  buf(k,0)         = buf(k,j_size)
0492                  buf(k,j_size+1)  = buf(k,1)
0493                  buf(0,k)         = buf(i_size,k)
0494                  buf(i_size+1,k)  = buf(1,k)
0495              enddo
0496              return
0497              end
0498     c-----------------------------------------------------------
0499              subroutine repeat_margin (buf)
0500     c-----------------------------------------------------------
0501              implicit none
0502              include 'ia.inc'
0503              integer*1   buf(0:i_size+1,0:j_size+1)
0504              integer*2 k
0505
0506              buf(0,0)                = buf(1,1)
```

```
0507            buf(0,j_size+1)         = buf(1,j_size)
0508            buf(i_size+1,0)         = buf(i_size,1)
0509            buf(i_size+1,j_size+1)  = buf(i_size,j_size)
0510
0511            do k=0,i_size+1
0512                buf(k,0)          = buf(k,1)
0513                buf(k,j_size+1)   = buf(k,j_size)
0514                buf(0,k)          = buf(1,k)
0515                buf(i_size+1,k)   = buf(i_size,k)
0516            enddo
0517            return
0518            end
0519    c-----------------------------------------------------------------
0520            subroutine set_margin (target,buf)
0521    c-----------------------------------------------------------------
0522            implicit none
0523            include 'ia.inc'
0524            integer*1 target
0525            integer*1 buf(0:i_size+1,0:j_size+1)
0526            integer*2 k
0527
0528
0529            do k=0,i_size+1
0530                    buf(k,0)=target
0531                    buf(k,j_size+1)=target
0532                    buf(0,k)=target
0533                    buf(i_size+1,k)=target
0534            enddo
0535            return
0536            end
0537
0538
0539    c-----------------------------------------------------------------
0540            subroutine in_boundary (buf1,buf2)
0541    c-----------------------------------------------------------------
0542    c   outer-most layer of the region
0543    c
0544            implicit none
0545            include 'ia.inc'
0546            integer*1 buf1(0:i_size+1,0:j_size+1)
0547            integer*1 buf2(0:i_size+1,0:j_size+1)
0548
0549            integer*1 temp_buf(0:i_size+1,0:j_size+1)
0550            integer*2   i,j,k,mode_step
0551            integer*1 ichain(0:7)   /0,-1,-1,-1, 0, 1, 1, 1/    ! row locations
0552            integer*1 jchain(0:7)   /1, 1, 0,-1,-1,-1, 0, 1/    ! column locatio
0553
0554            if(connect_mode.eq.0) then
0555                mode_step = 2
0556            else
0557                mode_step = 1
0558            endif
0559
0560            call copy_image (buf1,temp_buf)
0561
0562            call turn_margin_on (temp_buf)
0563
0564            nhit=0
0565            do i=1,i_size
0566                do j=1,j_size
0567
0568                    if(temp_buf(i,j)) then
0569                        do k=0,7,mode_step
0570                            if(.not.temp_buf(i+ichain(k),j+jchain(k))) then
0571                                nhit=nhit+1
0572                                if(nhit.gt.maxhit) then
0573                                    write(*,'('' A hit table overflows. '')')
0574                                    call exit
0575                                endif
0576                                i_hit(nhit)=i
0577                                j_hit(nhit)=j
0578                                go to 200         ! no need to check for the rest
0579                            endif
0580                        enddo
0581    200             continue
0582                    endif
```

```
0583                    enddo
0584                enddo
0585
0586                if(nhit.gt.0) then
0587                    write(*,'('' erosion nhits '',i5)') nhit
0588
0589                    call clear_image (buf2)
0590                    do j=1,nhit
0591                        buf2(i_hit(j),j_hit(j))=on
0592                    enddo
0593                endif
0594                call turn_margin_off(buf2)
0595                return
0596                end
0597
0598      c----------------------------------------------------------------
0599              subroutine out_boundary (buf1,buf2)
0600      c----------------------------------------------------------------
0601      c     inner-most layer of the complement of the region
0602      c
0603                implicit none
0604                include 'ia.inc'
0605                integer*1 buf1(0:i_size+1,0:j_size+1)
0606                integer*1 buf2(0:i_size+1,0:j_size+1)
0607
0608                integer*1 temp_buf(0:i_size+1,0:j_size+1)
0609                integer*2   i,j,k,mode_step
0610                integer*1 ichain(0:7)   /0,-1,-1,-1, 0, 1, 1, 1/     ! row locations
0611                integer*1 jchain(0:7)   /1, 1, 0,-1,-1,-1, 0, 1/     ! column locatio
0612
0613                if(connect_mode.eq.0) then
0614                    mode_step = 2
0615                else
0616                    mode_step = 1
0617                endif
0618
0619                call copy_image (buf1,temp_buf)
0620
0621                call turn_margin_off (temp_buf)
0622
0623                nhit=0
0624                do i=1,i_size
0625                    do j=1,j_size
0626
0627                        if(temp_buf(i,j)) then
0628                            do k=0,7,mode_step
0629                                if(.not.temp_buf(i+ichain(k),j+jchain(k))) then
0630                                    nhit=nhit+1
0631                                    if(nhit.gt.maxhit) then
0632                                        write(*,'('' A hit table overflows. '')')
0633                                        call exit
0634                                    endif
0635                                    i_hit(nhit)=i+ichain(k)
0636                                    j_hit(nhit)=j+jchain(k)
0637                                endif
0638                            enddo
0639                        endif
0640                    enddo
0641                enddo
0642
0643                if(nhit.gt.0) then
0644                    call clear_image (buf2)
0645                    do j=1,nhit
0646                        buf2(i_hit(j),j_hit(j))=on
0647                    enddo
0648                endif
0649                call turn_margin_off(buf2)
0650                return
0651                end
0652      c----------------------------------------------------------------
0653              subroutine cross_boundary (buf1,buf2,buf3)
0654      c----------------------------------------------------------------
0655      c    detect cross boundary      1 2    or    2 1
0656      c                               2 1          1 2
0657      c    or a given pixel belongs to both boundaries
0658      c
```

```
0659            implicit none
0660            include 'ia.inc'
0661            integer*1 buf1(0:i_size+1,0:j_size+1)
0662            integer*1 buf2(0:i_size+1,0:j_size+1)
0663            integer*1 buf3(0:i_size+1,0:j_size+1)
0664            integer*2   i,j
0665
0666            call turn_margin_off (buf1)
0667            call turn_margin_off (buf2)
0668
0669            nhit=0
0670            do i=1,i_size
0671                do j=1,j_size
0672
0673                    if(buf1(i,j)) then
0674                        if (buf2(i,j)) then                             ! intersecti
0675                            call bullseye (i,j)
0676
0677                        else if(buf1(i+1,j+1)) then                     !   [1] 2
0678                            if(buf2(i,j+1).and.buf2(i+1,j)) then        !    2  1
0679                                call bullseye (i,j)
0680                                call bullseye (i,int2(j+1))
0681                            endif
0682                        else if (buf1(i+1,j-1)) then                    !    2 [1]
0683                            if(buf2(i,j-1).and.buf2(i+1,j)) then        !    1  2
0684                                call bullseye (i,j)
0685                                call bullseye (i,int2(j-1))
0686                            endif
0687                        endif
0688                    endif
0689                enddo
0690            enddo
0691            if(nhit.gt.0) then
0692                write(*,'('' erosion nhits '',i5)') nhit
0693
0694                call clear_image (buf3)
0695                do j=1,nhit
0696                    buf3(i_hit(j),j_hit(j))=on
0697                enddo
0698            endif
0699            return
0700            end
0701    c-----------------------------------------------------------
0702            subroutine bullseye (i,j)
0703    c-----------------------------------------------------------
0704    c
0705            implicit none
0706            include 'ia.inc'
0707            integer*2   i,j
0708
0709            nhit=nhit+1
0710            if(nhit.gt.maxhit) then
0711                        write(*,'('' A hit table overflows. '')')
0712                        call exit
0713            endif
0714            i_hit(nhit)=i
0715            j_hit(nhit)=j
0716            return
0717            end
0718

0 serious errors detected.
    0 warning messages generated.
 1642 lines compiled.

0001    c
0002    c-----------------------------------------------------------
0003    c   binary section main program
0004    c-----------------------------------------------------------
0005            implicit none
0006    c
0007            include 'ia.inc'
0008    c
0009    c..external functions
```

```
0010          integer*4   get_image, open_new_file
0011          external    get_image, open_new_file
0012    c..local
0013          integer*4   i
0014
0015          call ia_init()
0016          if(get_image(in_lun1,in_buffer1).eq.success) then
0017              write(*,'('' image-A read '')')
0018              buf1_open=.true.
0019          else
0020              write(*,'('' image-A skipped '')')
0021              buf1_open=.false.
0022          endif
0023
0024          if(get_image(in_lun1,in_buffer2).eq.success) then
0025              write(*,'('' image-B read '')')
0026              buf2_open=.true.
0027          else
0028              write(*,'('' image-B skipped '')')
0029              buf2_open=.false.
0030          endif
0031
0032          if(get_image(in_lun1,in_buffer3).eq.success) then
0033              write(*,'('' image-Z read '')')
0034              buf3_open=.true.
0035          else
0036              write(*,'('' image-Z skipped '')')
0037              buf3_open=.false.
0038          endif
0039
0040          if(buf1_open.and.buf2_open) then
0041              call cond_points()
0042              call create_half_image (in_buffer1,in_buffer2,in_buffer3,out_buf
0043              call save_image(out_buffer1)
0044
0045              call create_half_image (in_buffer2,in_buffer1,in_buffer3,out_buf
0046              call save_image(out_buffer2)
0047
0048              call or_images (out_buffer1, out_buffer2, out_buffer1)
0049              call save_image(out_buffer1)
0050
0051              call prune_image (out_buffer1,out_buffer1)
0052              call save_image(out_buffer1)
0053          endif
0054          call ia_finish()
0055          stop
0056
0057
0058          end
0059    c--------------------------------------------------------------
0060          subroutine ia_init()
0061    c--------------------------------------------------------------
0062          implicit none
0063          include 'ia.inc'
0064          n_cond_xy=0
0065          write(*,'('' initialized '')')
0066          return
0067          end
0068    c--------------------------------------------------------------
0069          subroutine cond_points()
0070    c--------------------------------------------------------------
0071          implicit none
0072          include 'ia.inc'
0073              call in_boundary (in_buffer1,out_buffer1)
0074              call in_boundary (in_buffer2,out_buffer2)
0075              call cross_boundary (out_buffer1,out_buffer2,out_buffer2)
0076              call make_cond_list(out_buffer2)
0077              if(buf3_open) call check_z()
0078          return
0079          end
0080    c--------------------------------------------------------------
0081          subroutine ia_finish()
0082    c--------------------------------------------------------------
0083          implicit none
0084          include 'ia.inc'
0085    d     close (in_lun1)
```

```
0086    d   close (in_lun2)
0087            close (out_lun)
0088            return
0089            end
0090    c-----------------------------------------------------------
0091            integer*4 function get_image(lun,buffer)
0092    c-----------------------------------------------------------
0093            implicit none
0094            include 'ia.inc'
0095            integer*1   buffer(0:in_rows+1,0:in_cols+1)
0096            integer     lun
0097            integer open_old_file
0098            external open_old_file
0099            integer*4   i
0100
0101
0102            if(open_old_file(lun).eq.success) then
0103                call read_image(lun,buffer)
0104                close (lun)
0105                get_image=success
0106            else
0107                get_image=cancelled
0108            endif
0109            return
0110            end
0111
0112    c-----------------------------------------------------------
0113            integer*4 function open_old_file(lun)
0114    c-----------------------------------------------------------
0115            implicit none
0116            include 'ia.inc'
0117            integer lun
0118            integer*4   status
0119
0120            open (file=*,unit=lun, status='old', disp='keep', recordtype='stream
0121        1        recordsize=in_cols-1,filetype='RawD', iostat=status)
0122            open_old_file = status
0123            return
0124
0125            end
0126    c-----------------------------------------------------------
0127            integer*4 function open_new_file(lun)
0128    c-----------------------------------------------------------
0129            implicit none
0130            include 'ia.inc'
0131            integer lun
0132            integer*4   status
0133
0134            open (file=*,unit=lun, status='new', disp='keep', recordtype='stream
0135        1        recordsize=256,carriagecontrol='none',iostat=status)
0136            open_new_file = status
0137            return
0138            end
0139    c-----------------------------------------------------------
0140            subroutine read_image(lun,buffer)
0141    c-----------------------------------------------------------
0142    c   read images
0143    c
0144            implicit none
0145            include 'ia.inc'
0146            integer*1   buffer(0:in_rows+1,0:in_cols+1)
0147            integer     lun
0148            integer*2   i,j
0149
0150            do i=1,i_size
0151                read(lun,'(512a1)') (buffer(i,j),j=1,in_cols)
0152            enddo
0153    c
0154    c.. clear edges
0155    c
0156            do i=0,in_rows+1
0157                buffer(i,0)=0
0158                buffer(i,in_cols+1)=0
0159            enddo
0160            do j=0,in_cols+1
0161                buffer(0,j)=0
```

```
0162              buffer(in_rows+1,j)=0
0163          enddo
0164          return
0165          end
0166   c--------------------------------------------------------------
0167          subroutine save_image(buf)
0168   c--------------------------------------------------------------
0169          implicit none
0170          include 'ia.inc'
0171          integer*1   buf(0:in_rows+1,0:in_cols+1)
0172   c..external functions
0173          integer*4   open_new_file
0174          external    open_new_file
0175
0176          if(open_new_file(out_lun).eq.success) then
0177              write(*,'('' writing an image file '')')
0178              call write_image (buf)
0179              close (out_lun)
0180          endif
0181          return
0182          end
0183
0184   c--------------------------------------------------------------
0185          subroutine write_image(buf)
0186   c--------------------------------------------------------------
0187   c   write image
0188   c
0189          implicit none
0190          include 'ia.inc'
0191          integer*1   buf(0:in_rows+1,0:in_cols+1)
0192
0193          integer*2   i,j
0194
0195          do i=1,i_size
0196              write(out_lun,'(512a1)') (buf(i,j),j=out_start_col,out_end_col)
0197          enddo
0198
0199          return
0200          end
0201
0202   c--------------------------------------------------------------
0203          subroutine create_half_image (buf1,buf2,buf3,buf4)
0204   c--------------------------------------------------------------
0205   c
0206   c
0207          implicit none
0208          include 'ia.inc'
0209          integer*1   buf1(0:in_rows+1,0:in_cols+1)
0210          integer*1   buf2(0:in_rows+1,0:in_cols+1)
0211          integer*1   buf3(0:in_rows+1,0:in_cols+1)
0212          integer*1   buf4(0:in_rows+1,0:in_cols+1)
0213          integer*1   temp_buf(0:in_rows+1,0:in_cols+1)
0214
0215          call copy_image (buf2,temp_buf)
0216          call erode_image (temp_buf,temp_buf)
0217          call or_not_images (buf1,temp_buf,buf3,buf4)
0218
0219          call skeleton_image (buf4,buf4)
0220
0221          return
0222          end
0223
0224
0225
0226
0227   c--------------------------------------------------------------
0228          logical function is_in_cond_xy (ixy,jxy)
0229   c--------------------------------------------------------------
0230   c
0231          implicit none
0232          include 'ia.inc'
0233          integer*2   ixy,jxy
0234          integer*2   k
0235
0236          if(n_cond_xy.ge.1) then
0237
```

```
0238            do k=1,n_cond_xy
0239                if(cond_xy(1,k).eq.ixy) then
0240                    if(cond_xy(2,k).eq.jxy) then
0241                        is_in_cond_xy = .true.
0242                        return
0243                    endif
0244                endif
0245            enddo
0246            is_in_cond_xy = .false.
0247
0248        else
0249            is_in_cond_xy = .false.
0250        endif
0251        return
0252        end
0253
0254 c------------------------------------------------
0255        subroutine add_conditional (buffer)
0256 c------------------------------------------------
0257 c
0258 c
0259        implicit none
0260        include 'ia.inc'
0261        integer*1 buffer(0:in_rows+1,0:in_cols+1)
0262        integer*2   k
0263
0264        if(n_cond_xy.le.0) return
0265
0266        do k=1,n_cond_xy
0267            buffer(cond_xy(1,k),cond_xy(2,k)) = on
0268        enddo
0269        return
0270        end
0271 c------------------------------------------------
0272        subroutine subtract_conditional (buffer)
0273 c------------------------------------------------
0274 c
0275 c
0276        implicit none
0277        include 'ia.inc'
0278        integer*1 buffer(0:in_rows+1,0:in_cols+1)
0279        integer*2   k
0280
0281        if(n_cond_xy.le.0) return
0282
0283        do k=1,n_cond_xy
0284            buffer(cond_xy(1,k),cond_xy(2,k)) = off
0285        enddo
0286        return
0287        end
0288 c------------------------------------------------
0289        subroutine make_cond_list (buffer)
0290 c------------------------------------------------
0291 c
0292 c
0293        implicit none
0294        include 'ia.inc'
0295        integer*1 buffer(0:in_rows+1,0:in_cols+1)
0296 c..local
0297        integer*2   i,j,k
0298        do i=1,i_size
0299            do j=1,j_size
0300                if(buffer(i,j)) then
0301                    n_cond_xy=n_cond_xy+1
0302                    if(n_cond_xy.gt.max_cond_xy) then
0303                        write(*,'('' Conditional array overflows '')')
0304                        call exit
0305                    endif
0306                    cond_xy(1,n_cond_xy)=i
0307                    cond_xy(2,n_cond_xy)=j
0308                endif
0309            enddo
0310        enddo
0311        write(*,'('' number of conditional points '',i5)') n_cond_xy
0312        return
0313        end
```

```
0314
0315      c-----------------------------------------------------------------
0316              subroutine check_z()
0317      c-----------------------------------------------------------------
0318      c   conditioanl image    128 -> 255
0319      c                        255 -> 0
0320      c
0321              implicit none
0322              include 'ia.inc'
0323
0324              integer*2   i,j,k, n_filled
0325              logical*2   found
0326
0327              n_filled = 0
0328              do i=1,i_size
0329                 found=.false.
0330                 j=0
0331                 do j=1,j_size
0332                    if(in_buffer3(i,j).eq.conditional) then
0333                         n_cond_xy=n_cond_xy+1
0334                         if(n_cond_xy.gt.max_cond_xy) then
0335                             write(*,'('' Conditional array overflows '')')
0336                             call exit
0337                         endif
0338                         cond_xy(1,n_cond_xy)=i
0339                         cond_xy(2,n_cond_xy)=j
0340                         write(*,'(''n/i/j'',3i5)') n_cond_xy,i,j
0341                    else if (in_buffer3(i,j).eq.on) then
0342                         in_buffer3(i,j)=off
0343
0344                    else if (in_buffer3(i,j).eq.fill) then
0345                         in_buffer3(i,j)=on
0346                         n_filled = n_filled + 1
0347                    endif
0348                 enddo
0349              enddo
0350              write(*,'('' number of conditional points '',i5)') n_cond_xy
0351              write(*,'('' number of filled points '',i5)') n_filled
0352
0353              return
0354              end 0 serious errors detected.
     0 warning messages generated.
  1058 lines compiled.

0001      c-----------------------------------------------------------------
0002              subroutine or_not_images (buf1,buf2,buf3,buf4)
0003      c-----------------------------------------------------------------
0004      c   pixel wise exclusive or operations
0005      c
0006              implicit none
0007              include 'ia.inc'
0008              integer*1    buf1(0:in_rows+1,0:in_cols+1)
0009              integer*1    buf2(0:in_rows+1,0:in_cols+1)
0010              integer*1    buf3(0:in_rows+1,0:in_cols+1)
0011              integer*1    buf4(0:in_rows+1,0:in_cols+1)
0012
0013              integer*2    i,j
0014
0015              do i=1,i_size
0016                 do j=out_start_col,out_end_col
0017                    buf4(i,j)=(buf1(i,j).or.buf3(i,j)).and.(.not.buf2(i,j))
0018                 enddo
0019              enddo
0020              return
0021              end
0022      c-----------------------------------------------------------------
0023              subroutine add_edges(input_buf)
0024      c-----------------------------------------------------------------
0025      c
0026      c
0027              implicit none
0028              include 'ia.inc'
0029              integer*1 input_buf(0:in_rows+1,0:in_cols+1)
```

```
0030
0031            integer*2    i,j
0032
0033
0034            do i=1,i_size
0035
0036                do j=out_start_col,out_end_col
0037                    if(input_buf(i,j)) then
0038                        if( (input_buf(i+1,j).eq.0).or.
0039       1                    (input_buf(i,j+1).eq.0).or.
0040       2                    (input_buf(i-1,j).eq.0).or.
0041       3                    (input_buf(i,j-1).eq.0)) then
0042                                out_buffer1(i,j)=out_buffer1(i,j).or.input_buf(i
0043                        endif
0044      *             else
0045      *                 out_buffer1(i,j)=0
0046                    endif
0047                enddo
0048            enddo
0049            return
0050            end
0051     c------------------------------------------------------------
0052            subroutine add_z(input_buf)
0053     c------------------------------------------------------------
0054     c  pixel wise exclusive or operations
0055     c
0056            implicit none
0057            include 'ia.inc'
0058            integer*1 input_buf(0:in_rows+1,0:in_cols+1)
0059
0060            integer*2    i,j,n
0061
0062
0063            n=0
0064            do i=1,i_size
0065                do j=out_start_col,out_end_col
0066                    if(input_buf(i,j).eq.fill) then
0067                        n=n+1
0068                        out_buffer1(i,j)=on
0069                    endif
0070                enddo
0071                write(out_lun,'(512a1)') (out_buffer1(i,j),j=out_start_col,out_e
0072            enddo
0073     d      write(*,'('' filling pixels '',i5)') n
0074
0075            return
0076            end 0 serious errors detected.
    0 warning messages generated.
  208 lines compiled.

c
c inclusion file for i_algebra.f
c
      integer i_size, j_size
      parameter (i_size=256, j_size=256)
      integer in_lun1, in_lun2, out_lun
      parameter (in_lun1=10, in_lun2=11, out_lun=12)
      integer in_rows, in_cols, out_start_col, out_end_col
      parameter (in_rows=256, in_cols=256,
     1     out_start_col=1,
     2     out_end_col=out_start_col+j_size-1)
      integer maxhit
      parameter (maxhit=i_size*30)
      integer*1  on,off,conditional,fill
      parameter  (on='ff'x,off=0,conditional='40'x,fill='80'x)
      logical*2  buf1_open, buf2_open, buf3_open
      integer*1 in_buffer1(0:in_rows+1,0:in_cols+1)
      integer*1 in_buffer2(0:in_rows+1,0:in_cols+1)
      integer*1 in_buffer3(0:in_rows+1,0:in_cols+1)
      integer*1 out_buffer1(0:in_rows+1,0:in_cols+1)
      integer*1 out_buffer2(0:in_rows+1,0:in_cols+1)
      integer*1 out_buffer3(0:in_rows+1,0:in_cols+1)
      common /buf1/ buf1_open,in_buffer1
```

```
      common /buf2/ buf2_open,in_buffer2
      common /buf3/ buf3_open,in_buffer3
      common /buf4/ out_buffer1
      common /buf5/ out_buffer2
      common /buf6/ out_buffer3
      integer*2    ncheck,i_hit(maxhit),j_hit(maxhit)
      integer*1    check(8),icheck(8),jcheck(8)
      integer*2    nhit
      integer*2    max_cond_xy
      parameter    (max_cond_xy=1000)
      integer*2    cond_xy(2,max_cond_xy),n_cond_xy
      common /template/ ncheck,check,icheck,jcheck,
     1              nhit,i_hit,j_hit,
     2              n_cond_xy, cond_xy integer*4    cancelled, success
      parameter    (cancelled=29,success=0)
      integer*4    connect_mode
      parameter    (connect_mode=0)    ! 0 for 8-connected, non-zero for 4-connected
```

Appendix --- List of distance_map subroutines

```
c------------------------------------------------------------
      subroutine distance_map (buf1,buf2,buf3)
c------------------------------------------------------------
c     buf1 and buf2 are two input arrays for sections A and B
c     buf3 is an output array of relative distance map normalized to full_scale
c
      implicit none
      include 'ia.inc'
      integer*1    buf1(0:max_rows+1,0:max_cols+1)
      integer*1    buf2(0:max_rows+1,0:max_cols+1)
      integer*1    buf3(0:max_rows+1,0:max_cols+1)
c
      logical      is_empty_image
      external     is_empty_image
      real         float_byte
      external     float_byte
c
      real         d1,d2
      integer*2    i,j
      logical*1    free
      parameter    (free=.false.)
      logical*1    set1,set2
c
      real         full_scale
      parameter (full_scale=128)
c
      call deduct_images (buf1,buf2,buf3)
      if(.not.(is_empty_image(buf3))) then
              set1=.true.
              call sweep (buf3,buf1,temp_buf1) !from buf2 boundary
              call sweep (buf3,buf2,temp_buf2) !from buf1 boundary
              call norm_distance (temp_buf1,temp_buf2,temp_buf3)
              call save_image (temp_buf3)
      else
              set1=.false.
      endif call deduct_images (buf2,buf1,buf3)
      if(.not.(is_empty_image(buf3))) then
              set2=.true.
              call sweep (buf3,buf1,temp_buf1) !from buf2 boundary
              call sweep (buf3,buf2,temp_buf2) !from buf1 boundary
              call norm_distance (temp_buf1,temp_buf2,buf3)
              call save_image (buf3)
      else
              set2=.false.
      endif
c... combine or copy buffer(s)
c... if set2 is true and set1 is false, do nothing (buf3 is a correct buffer)

if(set1) then
              if(set2) then
                      call or_images (buf3,temp_buf3,buf3)
              else
```

```
                call copy_image (temp_buf3,buf3)
            endif
        endif return
        end c-----------------------------------------------------------------
        subroutine sweep (buf1,buf2,buf3)
c-----------------------------------------------------------------
c       buf1 and buf2 are input arrays of Sections A and B
c       buf3 is an output array of distance from buf1 boundary to buf2 boundary.
c
        implicit none
        include 'ia.inc'
        integer*1   buf1(0:max_rows+1,0:max_cols+1)
        integer*1   buf2(0:max_rows+1,0:max_cols+1)
        integer*1   buf3(0:max_rows+1,0:max_cols+1)
c
        real    float_byte
        external float_byte
c
        real    d1,d2
        integer*2   i,j
        logical*1   free
        parameter   (free=.false.)
c
        real    full_scale
        parameter (full_scale=128)

call double_boundary (buf2,buf3)
            call deduct_images (buf3,buf1,buf3) out_boundary
            call clear_cond_list ()
            call make_cond_list (buf3)
            call grass_fire (buf1,buf3,free)
            return entry norm_distance (buf1,buf2,buf3)

c.. normalize distance
            call clear_image(buf3)
            do i=1,n_rows
                do j=1,n_cols
                    if(buf1(i,j)) then
                        if(buf2(i,j).eq.0) then
                            write(*,'('' unbalanced '',2I5)'),i,j
                        endif
                        d1=float_byte(buf1(i,j))
                        d2=float_byte(buf2(i,j))
                        buf3(i,j)=full_scale*d2/(d1+d2) + .5
                    endif
                enddo
            enddo
d           call save_image (buf3)

return
        end c-----------------------------------------------------------------
        subroutine grass_fire (buf1,buf2,free)
c-----------------------------------------------------------------
c
c.. if free burning (free=.true.), no dilation before.
c
        implicit none
        include 'ia.inc'
        integer*1 buf1(0:max_rows+1,0:max_cols+1)
        integer*1 buf2(0:max_rows+1,0:max_cols+1)
        logical*1 free
        integer*1 temp_buf(0:max_rows+1,0:max_cols+1)
```

```
        integer*1 layer
        logical*1 change
        save    layer call copy_image(buf1,temp_buf)

if(.not.free) then
                call dilate_image (temp_buf,temp_buf)
                layer=-1     ! starts with 0 (dilated layer)
        else
                layer=0              ! starts with 1
        endif call   clear_image(buf2)
        change=.true.

do while (change)
                layer=layer+1
                if(layer.gt.max_layers) then
                        write(*,'('' max_layers rearched '')')
                        go to 200
                endif
                call burn_grass (change,layer,temp_buf,buf2)
        enddo
200     return
        end c----------------------------------------------------------------
        subroutine burn_grass (change,layer,buf1,buf2)
c----------------------------------------------------------------
c
c
c............ protect from out_boundary.
c       now calls is_touch_cond_xy instead of   is_in_cond_xy implicit none
        include 'ia.inc'
        integer*1 buf1(0:max_rows+1,0:max_cols+1)
        integer*1 buf2(0:max_rows+1,0:max_cols+1)
        integer*1    layer
        logical*1    change
        integer*2    i,j,k,mode_step integer*1 ichain(0:7)    /0,-1,-1,-1, 0, 1, 1, 1/   ! row locations
        integer*1 jchain(0:7)    /1, 1, 0,-1,-1,-1, 0, 1/   ! column locations
c
        logical            is_in_cond_xy
        external     is_in_cond_xy
        logical             is_touch_cond_xy
        external     is_touch_cond_xy if(connect_mode.eq.0) then
                mode_step = 2
        else
                mode_step = 1
        endif call turn_margin_off (buf1)

nhit=0
        do i=1,n_rows
                do j=1,n_cols if(buf1(i,j)) then
                                do k=0,7,mode_step
                                        if(.not.buf1(i+ichain(k),j+jchain(k))) then
                                                if(is_in_cond_xy(i,j)) go to 300
                                                nhit=nhit+1
                                                if(nhit.gt.max_hits) then
                                                        write(*,'('' A hit table overflows. '')')
                                                        call exit
                                                endif
                                                i_hit(nhit)=i
                                                j_hit(nhit)=j
                                                go to 300          ! no need to check for the
                                                                   ! rest of neighbors
```

```
                              endif
                         enddo
                    endif
300            continue
           enddo
       enddo if(nhit.gt.0) then
           do j=1,nhit
                        buf1(i_hit(j),j_hit(j))=off
                        buf2(i_hit(j),j_hit(j))=layer
           enddo
       else
           change = .false.
       endif
           write(*,'('' layer-n_hit '',2I5)') layer,nhit call turn_margin_off(buf1)
       return
       end
```

What is claimed is:

1. A method of three-dimensional display, comprising the steps of:
   (a) providing a first two-dimensional section containing a first region;
   (b) providing a second two-dimensional section containing a second region;
   (c) forming at least one two-dimensional interpolation section, said interpolation section containing an interpolation region formed by the following steps:
   (i) copying said first region as a region A of said interpolation section;
   (ii) copying said second region as a region B of said interpolation section;
   (iii) forming one or more regions Z between regions A and B;
   (iv) connecting said regions A and B where regions A and B each having a boundary, where one portion of the boundary of each of regions A and B abuts region Z;
   (v) defining a first distance measure for all points in regions A or Z and outside of region B with said first distance measure increasing from a first low value on the boundary of A to a second high value on the boundary of B;
   (vi) defining a second distance measure for all points in regions B or Z and outside of region A with said second distance measure increasing from a second low value on the boundary of B to a second high value on the boundary of A;
   (vii) defining said interpolation section as all points which (1) are in A and B, (2) are in A and have a first distance measure greater than a first constant, (3) are in B and have a second distance measure greater than a second constant, or (4) are in Z and have a first distance measure greater than said first constant and have a second distance measure greater than said second constant; and
   (d) stacking said first, second, and interpolation sections with said interpolation section between said first and second sections to form a three-dimensional display.

* * * * *